(12) United States Patent
Wade

(10) Patent No.: US 6,289,155 B1
(45) Date of Patent: Sep. 11, 2001

(54) WAVELENGTH DIVISION MULTIPLEXING/ DEMULTIPLEXING DEVICES USING DUAL HIGH INDEX OF REFRACTION CRYSTALLINE LENSES

(75) Inventor: Robert Kent Wade, Stratham, NH (US)

(73) Assignee: LightChip, Inc., Salem, NH (US)

( * ) Notice: Subject to any disclaimer, the term of this patent is extended or adjusted under 35 U.S.C. 154(b) by 0 days.

(21) Appl. No.: 09/342,142

(22) Filed: Jun. 29, 1999

Related U.S. Application Data

(63) Continuation-in-part of application No. 08/990,199, filed on Dec. 13, 1997, now Pat. No. 5,999,672, which is a continuation-in-part of application No. 09/323,094, filed on Jun. 1, 1999.

(51) Int. Cl.⁷ ...................................................... B02B 6/34
(52) U.S. Cl. ................................. 385/37; 385/33; 385/34
(58) Field of Search ................................. 385/14, 24, 33, 385/34, 37, 49, 39; 359/130, 131; 372/50

(56) References Cited

U.S. PATENT DOCUMENTS

| | | | |
|---|---|---|---|
| 4,111,524 | 9/1978 | Tomlinson, III | 350/96.19 |
| 4,153,330 | 5/1979 | Tomlinson, III | 350/96.17 |
| 4,198,117 | 4/1980 | Kobayashi | 350/96.19 |
| 4,274,706 | 6/1981 | Tangonan | 350/96.19 |
| 4,279,464 | 7/1981 | Colombini | 350/96.19 |
| 4,299,488 | 11/1981 | Tomlinson, III | 356/328 |
| 4,343,532 | 8/1982 | Palmer | 350/96.19 |
| 4,387,955 | 6/1983 | Ludman et al. | 350/96.19 |
| 4,479,697 | 10/1984 | Kapany et al. | 350/96.18 |
| 4,522,462 | 6/1985 | Large et al. | 350/96.19 |
| 4,583,820 | 4/1986 | Flamand et al. | 350/96.19 |
| 4,622,662 | 11/1986 | Laude et al. | 370/3 |
| 4,626,069 | 12/1986 | Dammann et al. | 350/162.2 |
| 4,634,215 | 1/1987 | Reule | 350/96.16 |

(List continued on next page.)

OTHER PUBLICATIONS

G. R. Harrison, Ph.D., Sc.D. et al., Practical Spectroscopy, Chapter 4—Diffraction–Grating Spectrographs, Prentice–Hall (1948).

W. J. Tomlinson, Wavelength multiplexing in multimode optical fibers, Applied Optics, vol. 16, No. 8 (Aug. 1977).

W. J. Tomlinson et al., Optical multiplexer for multimode fiber transmission systems, Appl. Phys. Lett., vol. 31, No. 3 (Aug. 1977).

W. J. Tomlinson et al. Optical wavelength–division multiplexer for the 1–1.4 μm spectral region, Electronics Letters, vol. 14, No. 11 (May 25, 1973).

(List continued on next page.)

*Primary Examiner*—Hung N. Ngo
(74) *Attorney, Agent, or Firm*—Hunton & Williams

(57) ABSTRACT

A wavelength division multiplexing device is disclosed. In one embodiment, the wavelength division multiplexing device comprises a crystalline collimating lens for collimating a plurality of monochromatic optical beams, a diffraction grating for combining the plurality of collimated, monochromatic optical beams into a multiplexed, polychromatic optical beam, and a crystalline focusing lens for focusing the multiplexed, polychromatic optical beam.

46 Claims, 8 Drawing Sheets

U.S. PATENT DOCUMENTS

| | | | |
|---|---|---|---|
| 4,643,519 | 2/1987 | Bussard et al. | 350/96.19 |
| 4,652,080 | 3/1987 | Carter et al. | 350/96.19 |
| 4,671,607 | 6/1987 | Laude | 350/96.15 |
| 4,703,472 | 10/1987 | Blumentritt et al. | 370/3 |
| 4,708,425 | 11/1987 | Gouali et al. | 350/96.16 |
| 4,726,645 | 2/1988 | Yamashita et al. | 350/96.18 |
| 4,740,951 | 4/1988 | Lizet et al. | 370/3 |
| 4,741,588 | 5/1988 | Nicia et al. | 350/96.19 |
| 4,744,618 | 5/1988 | Mahlein | 350/96.19 |
| 4,746,186 | 5/1988 | Nicia | 350/96.13 |
| 4,747,655 * | 5/1988 | Shirasaki . | |
| 4,748,614 | 5/1988 | Dammann et al. | 370/3 |
| 4,749,247 | 6/1988 | Large | 350/96.16 |
| 4,752,108 | 6/1988 | Vollmer | 350/96.12 |
| 4,760,569 | 7/1988 | Mahlein | 350/3 |
| 4,763,969 | 8/1988 | Khoe et al. | 350/96.19 |
| 4,773,063 | 9/1988 | Hunsperger et al. | 370/3 |
| 4,786,133 | 11/1988 | Gidon et al. | 350/96.19 |
| 4,819,224 | 4/1989 | Laude | 370/3 |
| 4,834,485 | 5/1989 | Lee | 350/96.19 |
| 4,836,634 | 6/1989 | Laude | 350/96.19 |
| 4,857,726 | 8/1989 | Kinney et al. | 250/226 |
| 4,923,271 | 5/1990 | Henry et al. | 350/96.19 |
| 4,926,412 | 5/1990 | Jannson et al. | 370/3 |
| 4,930,855 | 6/1990 | Clark et al. | 350/96.19 |
| 4,934,784 | 6/1990 | Kapany et al. | 350/96.18 |
| 5,026,131 | 6/1991 | Jannson et al. | 350/3.7 |
| 5,107,359 | 4/1992 | Ohuchida | 359/124 |
| 5,170,451 | 12/1992 | Ohshima | 385/43 |
| 5,228,103 | 7/1993 | Chen et al. | 385/14 |
| 5,278,687 | 1/1994 | Jannson et al. | 359/125 |
| 5,355,237 | 10/1994 | Lang et al. | 359/130 |
| 5,363,220 | 11/1994 | Kuwayama et al. | 359/3 |
| 5,440,416 | 8/1995 | Cohen et al. | 359/127 |
| 5,442,472 | 8/1995 | Skrobko | 359/110 |
| 5,450,510 | 9/1995 | Boord et al. | 385/37 |
| 5,457,573 | 10/1995 | Iida et al. | 359/569 |
| 5,500,910 | 3/1996 | Boudreau et al. | 385/24 |
| 5,513,289 | 4/1996 | Hosokawa et al. | 385/33 |
| 5,526,155 | 6/1996 | Knox et al. | 359/130 |
| 5,541,774 | 7/1996 | Blankenbecler | 359/653 |
| 5,555,334 | 9/1996 | Ohnishi et al. | 385/93 |
| 5,583,683 | 12/1996 | Scobey | 359/127 |
| 5,606,434 | 2/1997 | Feldman et al. | 359/3 |
| 5,657,406 | 8/1997 | Ball | 385/24 |
| 5,703,722 | 12/1997 | Blankenbecler | 359/653 |
| 5,742,416 | 4/1998 | Mizrahi | 359/134 |
| 5,745,270 | 4/1998 | Koch | 359/124 |
| 5,745,271 | 4/1998 | Ford et al. | 359/130 |
| 5,745,612 | 4/1998 | Wang et al. | 385/24 |
| 5,748,350 | 5/1998 | Pan et al. | 359/130 |
| 5,748,815 | 5/1998 | Hamel et al. | 385/37 |
| 5,768,450 | 6/1998 | Bhagavatula | 385/24 |
| 5,777,763 | 7/1998 | Tomlinson, III | 359/130 |

OTHER PUBLICATIONS

T. Miki et al., Viabilities of the wavelength–division–multiplexing transmission system over an optical fiber cable, IEEE Transactions on Communications, vol. Com–26, No. 7 (Jul. 1978).

K. Aoyama et al., Optical demultiplexer for a wavelength division multiplexing system, Applied Optics, vol. 18, No. 8 (Apr. 15, 1979).

K. Aoyama et al., Low–loss optical demultiplexer for WDM systems in the 0.8–$\mu$m wavelength region, Applied Optics, vol. 18, No. 16 (Aug. 15, 1979).

R. Watanabe et al., Optical Demultiplexer Using Concave Grating in 0.7–0.9 um Wavelength Region, Electronics Letters, vol. 16, No.3 (Jan. 31, 1980).

K. Kobayashi et al., Microoptic Grating Multiplexers and Optical Isolators for Fiber–Optic Communications, Journal of Quantum Electronics, vol. QE–16, No. 1 (Jan. 1980).

Yohji Fujii et al., Optical Demultiplexer Using a Silison Echelette Grating, IEEE Journal of Quantum Electronics, vol. QE–16, No. 2 (Feb. 1980).

W. J. Tomlinson, Applications of GRIN–rod lenses in optical fiber communication systems, Applied Optics, vol. 19, No. 7 (Apr. 1, 1980).

A. Nicia, Wavelength Multiplexing and Demultiplexing Systems for Singlemode and Multimode Fibers, Conference Proceedings, European Conference on Optical Communication Sep. 8–11, 1981).

B. D. Metcalf et al., High–capacity wavelength demultiplexer with a large–diameter GRIN rod lens, Applied Optics, vol. 21, No. 5 (Mar. 1, 1982).

J. Lipson et al., Low–Loss Wavelength Division Multiplexing (WDM) Devices for Single–Mode Systems, Journal of Lightwave Technology, vol. LT–1, No. 2 (Jun. 1983).

G. Winzer, Wavelength Multiplexing Components—A Review of Single–Mode Devices and their Applications, Journal of Lightwave Technology, vol. LT–2, No. 4 (Aug. 1984).

H. Ishio et al., Review and Status of Wavelength–Division–Multiplexing Technology and Its Application, Journal of Lightwave Technology, vol. LT–2, No. 4 (Aug. 1984).

Y. Fujii et al., Optical Demultiplexer Utilizing an Ebert Mounting Silicon Grating, Journal of Lightwave Technology, vol. LT–2, No. 5 (Oct. 1984).

J. Lipson et al., A Four–Channel Lightwave Subsystem Using Wavelength Division Multiplexing, IEEE Journal of Lightwave Technology, vol. LT–3, No. 1 (Feb. 1985).

B. Hillerich et al., Wide Passband Grating Multiplexer for Multimode Fibers, Journal of Lightwave Technology, vol. LT–3, No. 3 (Jun. 1985).

J. Lipson et al., A Six–Channel Wavelength Multiplexer and Demultiplexer for Single Mode Systems, Journal of Lightwave Technology, vol. LT–3, No. 5 (Oct. 1985).

I. Nishi et al., Broad Passband Multi/Demultiplexer for Multimode Fibers Using a Diffracting Grating and Retroreflectors, Journal of Lightwave Technology, vol. LT–5, No. 12 (Dec. 1987).

B. Moslehi et al., Fiber–optic wavelength–division multiplexing and demultiplexing using volume holographic gratings, Optics Letters, vol. 14, No. 19 (Oct. 1, 1989).

Y. Huang et al., Wavelength–division–multiplexing and – demultiplexing by using a substrate–mode grating pair, Optics Letters, vol. 17, No. 22 (Nov. 15, 1992).

M. Wu et al., Design Considerations for Rowland Circle Gratings Used in Photonic Integrated Devices for WDM Applicaitons, Journal of Lightwave Technology, vol. 12, No. 11 (Nov. 1994).

A. Stavdas et al., Design of a holographic concave grating used as a multiplexer/demultiplexer in dense wavelength–routed optical networks with subnanometer channel spacing, Journal of Modern Optics, vol. 42, No. 9, pp. 1863–1874 (Sep. 1995).

A. Stavdas et al., Free–Space Aberration–Corrected Diffraction Grating Demultiplexer for Application in Densely–Spaced, Subnanometer Wavelength Routed Optical Networks, IEEE Electronic Letters, vol. 31, No. 16, pp. 1368–1370 (Aug. 1995).

D. Wisely, High performance 32 channel HDWDM multiplexer with Inm channel spacing and 0.7nm bandwidth, SPIE, vol. 1578, Fiber Networks for Telephony and CATV (1991).

A. Cohen et al., Active management of 100–GHz–spaced WDM channels, Optical Fiber Communication Conference and the International Conference on Integrated Optics and Optical Fiber Communication, Technical Digest,Conference Edition (Feb. 24, 1999).

B. Keyworth et al., Low Loss, Temperature Stable Diffraction Grating Wavelength (DE) Multiplexer, National Fiber Optic Engineers Conference, Technical Proceedings, vol. I (Sep. 13–17, 1998).

M. Seki et al., 20—Channel Micro–Optic Grating Demultiplexer for 1.1–1.6um Band Using a Small Focusing Parameter Graded–Index Rod Lens, Electronics Letters, vol. 18, No. 6 (Mar. 18, 1982).

A. Koonen, A Compact Wavelength Demultiplexer Using Both Interference Filters and a Diffraction Grating, European Conference of Optical Communication, Conference Proceedings (Sep. 8–11,1981).

J. Conradi et al., Laser Based WDM Multichannel Video Transmissions System, Electronic Letters, vol. 17, No. 2, (Jan. 22, 1981).

J. Laude et al., Wavelength division multiplexing/demultiplexing (WDM)using diffraction gratings, SPIE, vol. 503, Application, Theory, and Fabricationof Periodic Structures (1984).

A. Livanos et al., Chirped–grating demultiplexers in dielectric waveguides, Applied Physics Letters, vol. 30, No. 10 (May 1977).

H. Obara et al., Star Coupler Based WDM Switch Employing Tunable Devices With Reduced Tunability Range, Electronic Letters, vol. 28, No. 13 (Jun. 1992).

A. Willner et al., 2–D WDM Optical Interconnections Using Multiple–Wavelength VCSEL's for Simultaneous and Reconfigurable Communication Among Many Planes, IEEE Phoyonics Technology Letters, vol. 5, No. 7 (Jul. 1993).

M. Wang et al., Five Channel Polymer Waveguide Wavelength Division Demultiplexer for the Near Infrared, IEEE Photonics Technology Letters, vol. 3, No. 1 (Jan. 1991).

M. Li et al., Two–channel surface–normal wavelength demultiplexer using substrate guided waves in conjunction with multiplexed waveguide holograms, Appl. Phys. Lett., vol. 66, No. 3 (Jan. 1995).

J. Laude et al., Stimas, A Grating Multiplexer for Monomode or Multimode Fibers, Ninth European Conference on Optical Communication–ECOC83, Geneva, Switzerland (Oct. 23–26, 1983).

R. Watanabe et al., Optical Grating Multiplexer in the 1.1—1.5mm Wavelength Region, Electronics Letters, vol. 16, No. 3 (Jan. 31, 1980).

G.D. Khoe, New Integrated Subscriber Star Network Combining Maximum Versatility With Minimum Costs of Installation and Maintenance, European Conference on Optical Communication, Conference Proceedings, Copenhagen, Bella Center (Sep. 8–11, 1981).

T. Lingelsheim et al., Fabrication of micro–optical wavelength division multiplexer (WDM) gratings on glass using an ion etching technique, SPIE vol. 503, Application, Theory, and Fabrication of Periodic Structures (1984).

D. Maystre et al., Optimization of wavelength demultiplexer in fiber optics using gold echelette gratings, SPIE vol. 503, Application, Theory, and Fabrication of Periodic Structures (1984).

* cited by examiner

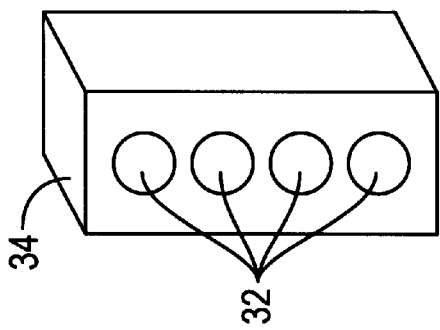
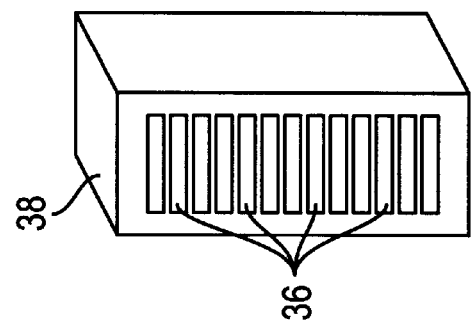
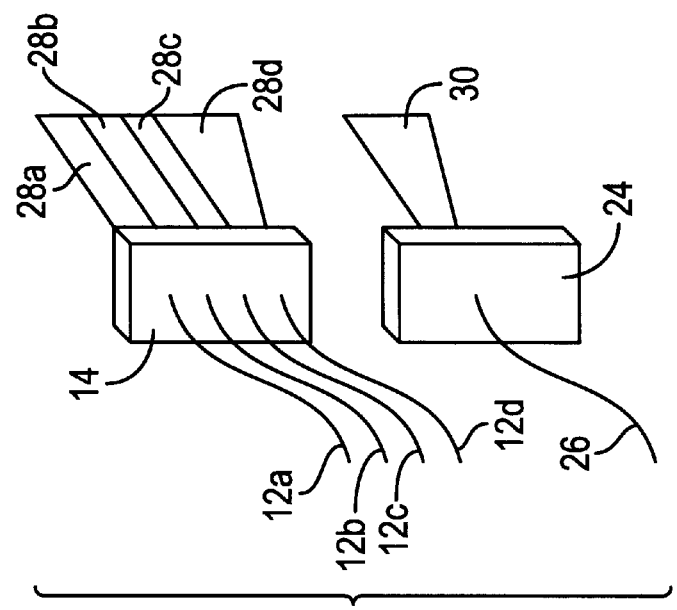

WAVELENGTH DIVISION MULTIPLEXING/DEMULTIPLEXING DEVICES USING DUAL HIGH INDEX OF REFRACTION CRYSTALLINE LENSES

CROSS-REFERENCE TO RELATED APPLICATIONS

This patent application is a continuation-in-part patent application of U.S. patent application Ser. No. 08/990,199, filed Dec. 13, 1997, now U.S. Pat. No. 5,999,672 which is hereby incorporated by reference herein in its entirety.

This patent application is also a continuation-in-part patent application of U.S. patent application Ser. No. 09/323,094, filed Jun. 1, 1999, which is hereby incorporated by reference herein in its entirety.

FIELD OF THE INVENTION

The present invention relates generally to wavelength division multiplexing/demultiplexing and, more particularly, to wavelength division multiplexing/demultiplexing devices using dual high index of refraction crystalline lenses.

BACKGROUND OF THE INVENTION

Wavelength division multiplexing (WDM) is a rapidly emerging technology that enables a very significant increase in the aggregate volume of data that can be transmitted over optical fibers. Prior to the use of WDM, most optical fibers were used to unidirectionally carry only a single data channel at one wavelength. The basic concept of WDM is to launch and retrieve multiple data channels in and out, respectively, of an optical fiber. Each data channel is transmitted at a unique wavelength, and the wavelengths are appropriately selected such that the channels do not interfere with each other, and the optical transmission losses of the fiber are low. Today, commercial WDM systems exist that allow for the transmission of 2 to 100 simultaneous data channels.

WDM is a cost-effective method of increasing the volume of data (commonly termed bandwidth) transferred over optical fibers. Alternate competing technologies for increasing bandwidth include the burying of additional fiber optic cable or increasing the optical transmission rate over optical fiber. The burying of additional fiber optic cable is quite costly as it is presently on the order of $15,000 to $40,000 per kilometer. Increasing the optical transmission rate is limited by the speed and economy of the electronics surrounding the fiber optic system. One of the primary strategies for electronically increasing bandwidth has been to use time division multiplexing (TDM), which groups or multiplexes multiple lower rate electronic data channels together into a single very high rate channel. This technology has for the past 20 years been very effective for increasing bandwidth. However, it is now increasingly difficult to improve transmission speeds, both from a technological and an economical standpoint. WDM offers the potential of both an economical and technological solution to increasing bandwidth by using many parallel channels.

Further, WDM is complimentary to TDM. That is, WDM can allow many simultaneous high transmission rate TDM channels to be passed over a single optical fiber.

The use of WDM to increase bandwidth requires two basic devices that are conceptually symmetrical. The first device is a wavelength division multiplexer. This device takes multiple beams, each with discrete wavelengths that are initially spatially separated in space, and provides a means for spatially combining all of the different wavelength beams into a single polychromatic beam suitable for launching into an optical fiber. The multiplexer may be a completely passive optical device or may include electronics that control or monitor the performance of the multiplexer. The input to the multiplexer is typically accomplished with optical fibers, although laser diodes or other optical sources may also be employed. As mentioned above, the output from the multiplexer is a single polychromatic beam which is typically directed into an optical fiber.

The second device for WDM is a wavelength division demultiplexer. This device is functionally the opposite of the wavelength division multiplexer. That is, the wavelength division demultiplexer receives a polychromatic beam from an optical fiber and provides a means of spatially separating the different wavelengths of the polychromatic beam. The output from the demultiplexer is a plurality of monochromatic beams which are typically directed into a corresponding plurality of optical fibers or photodetectors.

During the past 20 years, various types of WDMs have been proposed and demonstrated. For example, (1) W. J. Tomlinson, *Applied Optics*, Vol. 16, No. 8, pp. 2180–2194 (August 1977); (2) A. C. Livanos et al., *Applied Physics Letters*, Vol. 30, No. 10, pp. 519–521 (May 15, 1977); (3) H. Ishio et al., *Journal of Lightwave Technology*, Vol 2, No. 4, pp. 448–463 (August 1984); (4) H. Obara et al., *Electronics Letters*, Vol. 28, No. 13, pp. 1268–1270 (Jun. 18, 1992); (5) A. E. Willner et al., *IEEE Photonics Technology Letters*, Vol. 5, No. 7, pp. 838–841 (July 1993); and Y. T. Huang et al., *Optical Letters*, Vol. 17, No. 22, pp. 1629–1631 (Nov. 15, 1992), all disclose some form of WDM device and/or method. However, all of the above-listed approaches employ lenses formed of standard optical glass materials such as, for example, BK7, FK3, and SF6. While these standard optical glass materials are adequate for use with multimode optical fibers, they are generally inadequate for use with single mode optical fibers because the core diameter of a single mode optical fiber (i.e., typically 8 $\mu$m) is much smaller than the core diameter of a multimode optical fiber (i.e., typically 62.5 $\mu$m). That is, WDM devices employing lenses formed of standard optical glass materials have heretofore be unable to receive and transmit optical beams from and to single mode optical fibers, respectively, without incurring unacceptable amounts of insertion loss and channel crosstalk. These unacceptable levels of insertion loss and channel crosstalk are largely due to the inadequate imaging capabilities of the lenses formed of standard optical glass materials.

One proposed solution to the above-described optical imaging problem has been to add additional lenses formed of standard optical glass materials to the WDM devices, thereby resulting in WDM devices having doublet, triplet, and even higher number lens configurations. By adding these additional lenses to the WDM devices, wherein the added lenses typically have alternating high and low refraction indexes, aberrations caused mainly by the spherical nature of the lenses are effectively canceled out. However, an increased cost is associated with adding these additional lenses due to the direct cost of the additional lenses, as well as the indirect costs associated with the increased complexity and resulting decreased manufacturability of WDM devices having multiple lenses.

Another proposed solution to the above-described optical imaging problem has been to use gradient refractive index lenses (e.g., Gradium lenses) in the WDM devices. The use of these gradient refractive index lenses results in a significant improvement in the quality of the imaging system within the WDM devices. However, costs associated with manufacturing these gradient refractive index lenses is significantly greater than the costs associated with manufacturing standard homogeneous lenses, despite the fact that both are typically formed of standard optical glass materials.

In view of the foregoing, there remains a real need for a WDM device which possesses or allows for all the characteristics of: low cost, component integration, environmental and thermal stability, low channel crosstalk, low channel signal loss, ease of interfacing, large number of channels, and narrow channel spacing. Accordingly, it would be desirable to provide a WDM device which overcomes the above-described inadequacies and shortcomings, while possessing or allowing for all of the above-stated characteristics.

OBJECTS OF THE INVENTION

The primary object of the present invention is to provide wavelength division multiplexing/demultiplexing devices which use dual high index of refraction crystalline lenses to achieve increased device performance, as well as reduced device cost, complexity, and manufacturing risk.

The above-stated primary object, as well as other objects, features, and advantages, of the present invention will become readily apparent from the following detailed description which is to be read in conjunction with the appended drawings.

SUMMARY OF THE INVENTION

According to the present invention, a wavelength division multiplexing device is provided. In one embodiment, the wavelength division multiplexing device comprises a crystalline collimating lens for collimating a plurality of monochromatic optical beams, a diffraction grating for combining the plurality of collimated, monochromatic optical beams into a multiplexed, polychromatic optical beam, and a crystalline focusing lens for focusing the multiplexed, polychromatic optical beam.

The crystalline collimating lens and the crystalline focusing lens are preferably plano-convex lenses, or bi-convex lenses, although other lens configurations are possible. For example, the crystalline collimating lens and the crystalline focusing lens can be spherical or aspherical. Also, the crystalline collimating lens and the crystalline focusing lens have high indexes of refraction and preferably operate in the infrared (IR) region of the electromagnetic spectrum since this is the region where the power loss (attenuation) and dispersion of silica-based optical fibers is very low. Accordingly, the crystalline collimating lens and the crystalline focusing lens are typically formed of crystalline materials selected from the group consisting of silicon, germanium, gallium arsenide, zinc sulfide, cadmium sulfide, zinc selenide, and cadmium selenide, as well as from any of a number of other appropriate high index of refraction crystalline materials that efficiently transmit optical beams in the infrared (IR) region of the electromagnetic spectrum. The diffraction grating is preferably a transmissive diffraction grating.

In accordance with other aspects of the present invention, the wavelength division multiplexing device is provided in integrated form. That is, an integrated wavelength division multiplexing device is provided comprising a crystalline collimating lens for collimating a plurality of monochromatic optical beams, a first homogeneous index boot lens affixed to the crystalline collimating lens for transmitting the plurality of collimated, monochromatic optical beams from the crystalline collimating lens, wherein the first homogeneous index boot lens has a planar exit surface, and a diffraction grating formed at the planar exit surface of the first homogeneous index boot lens for combining the plurality of collimated, monochromatic optical beams into a multiplexed, polychromatic optical beam.

In accordance with further aspects of the present invention, the integrated wavelength division multiplexing device may include a second homogeneous index boot lens affixed to the crystalline collimating lens for transmitting the plurality of monochromatic optical beams to the crystalline collimating lens. The second homogeneous index boot lens preferably has a planar entry surface for accepting the plurality of monochromatic optical beams from at least one optical source. (eg., optical fibers, laser diodes) Alternatively, the integrated wavelength division multiplexing device may do without the second homogeneous index boot lens, and the crystalline collimating lens can have a planar entry surface for accepting the plurality of monochromatic optical beams from at least one optical source. (e.g. optical fibers, photodetectors)

In accordance with still further aspects of the present invention, the diffraction grating can be a transmissive diffraction grating and the integrated wavelength division multiplexing device may include a transmissive element associated with the transmissive diffraction grating, wherein the transmissive element preferably has at least one reflective surface for reflecting the multiplexed, polychromatic optical beam. The integrated wavelength division multiplexing device may then also include a second homogeneous index boot lens affixed to the transmissive element for transmitting the multiplexed, polychromatic optical beam from the transmissive element, and a crystalline focusing lens affixed to the second homogeneous index boot lens for focusing the multiplexed, polychromatic optical beam. The integrated wavelength division multiplexing device may then further include a third homogeneous index boot lens affixed to the crystalline focusing lens for transmitting the focused, multiplexed, polychromatic optical beam from the crystalline focusing lens. The third homogeneous index boot lens preferably has a planar exit surface for outputting the focused, multiplexed, polychromatic optical beam to at least one optical receiver (e.g., optical fibers, photodetectors). Alternatively, the integrated wavelength division multiplexing device may do without the third homogeneous index boot lens, and the crystalline focusing lens can have a planar exit surface for outputting the focused, multiplexed, polychromatic optical beam to at least one optical receiver. (e.g., optical fibers photodectors)

In accordance with other aspects of the present invention, the wavelength division multiplexing device is provided in an alternative integrated form. That is, an alternative integrated wavelength division multiplexing device is provided comprising a crystalline focusing lens for focusing a multiplexed, polychromatic optical beam, a first homogeneous index boot lens affixed to the crystalline focusing lens for transmitting the multiplexed, polychromatic optical beam to the crystalline focusing lens, wherein the first homogeneous index boot lens has a planar entry surface, and a diffraction grating formed at the planar entry surface of the first homogeneous index boot lens for combining a plurality of monochromatic optical beams into the multiplexed, polychromatic optical beam.

In accordance with further aspects of the present invention, the diffraction grating can be a transmissive diffraction grating and the alternative integrated wavelength division multiplexing device may include a transmissive element associated with the transmissive diffraction grating, wherein the transmissive element preferably has at least one reflective surface for reflecting the plurality of monochromatic optical beams toward the transmissive diffraction grating. The alternative integrated wavelength division multiplexing device may then also include a second homogeneous index boot lens affixed to the transmissive element for transmitting the plurality of monochromatic optical beams to the transmissive element, and a crystalline collimating lens affixed to the second homogeneous index boot lens for collimating the plurality of monochromatic optical beams prior to transmission by the second homogeneous index boot lens.

At this point it should be noted that the above-described wavelength division multiplexing device, integrated wavelength division multiplexing device, and alternative integrated wavelength division multiplexing device are all bidirectional devices. Thus, the wavelength division multiplexing device can also be a wavelength division demultiplexing device, the integrated wavelength division multiplexing device can also be an integrated wavelength division demultiplexing device, and the alternative integrated wavelength division multiplexing device can also be an alternative integrated wavelength division demultiplexing device. Further, all of the above-described devices can be used simultaneously as both a multiplexer and a demultiplexer.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 1b is a perspective end view of a portion of the wavelength division multiplexing device shown in FIG. 1a.

FIG. 2a is a perspective view of a coupling device containing a plurality of laser diodes for replacing the plurality of optical input fibers in the multiplexing device shown in FIG. 1a.

FIG. 2b is a perspective view of a coupling device containing a plurality of photodetectors for replacing the plurality of optical input fibers in the demultiplexing device shown in FIG. 3.

DETAILED DESCRIPTION OF PREFERRED EMBODIMENTS

Figure 1A:
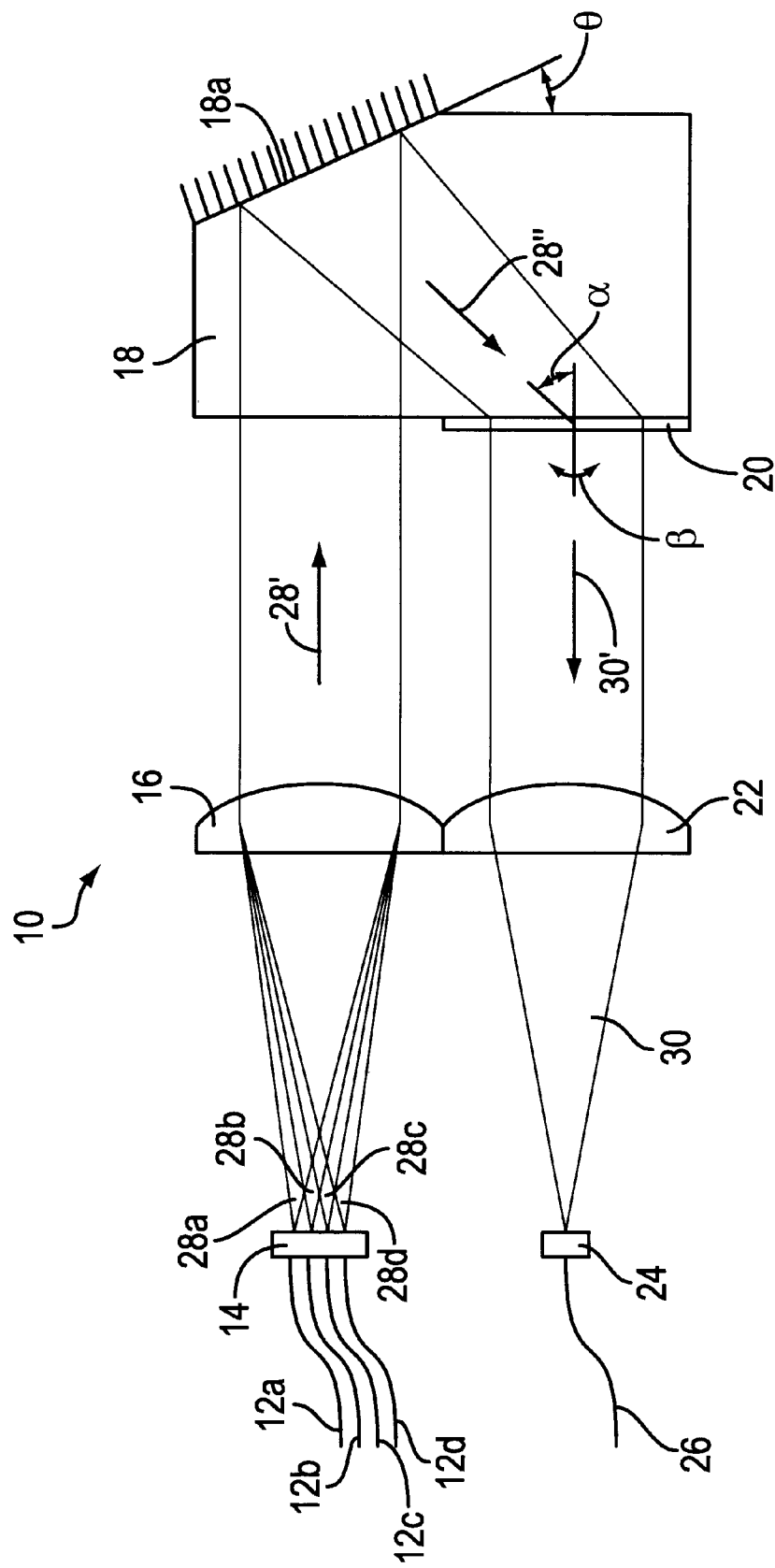
FIG. 1a is a side view of a wavelength division multiplexing device having dual plano-convex crystalline collimating/focusing lenses and a transmissive diffraction grating in accordance with the present invention.

Referring to FIG. 1a, there is shown a side view of a preferred embodiment of a wavelength division multiplexing device 10 in accordance with the present invention. The multiplexing device 10 comprises a plurality of optical input fibers 12, an input fiber coupling device 14, a plano-convex crystalline collimating lens 16, a reflecting element 18 having a reflecting surface 18a, a transmissive diffraction grating 20, a plano-convex crystalline focusing lens 22, an output fiber coupling device 24, and a single optical output fiber 26.

At this point it should be noted that the optical input fibers 12 and the optical output fiber 26, as well as any other optical fibers described herein as being used in conjunction with WDM devices in accordance with the present invention, are single mode optical fibers. Of course, however, this does not limit the present invention WDM devices to use with only single mode optical fibers. For example, the present invention WDM devices can also be used with multimode optical fibers.

It should also be noted that the multiplexing device 10, as well as any other WDM devices described herein as being WDM devices in accordance with the present invention, is operating in the infrared (IR) region of the electromagnetic spectrum as a dense wavelength division multiplexing (DWDM) device (i.e., operating with data channels having channel spacings of 1 nm or less). Of course, however, this does not limit the present invention WDM devices to being only DWDM devices. For example, the present invention WDM devices can also be standard WDM devices (i.e., operating with data channels having channel spacings greater than 1 nm).

Returning to FIG. 1a, the plurality of optical input fibers 12 are grouped into a one-dimensional input fiber array (i.e., a 1×4 array) by the input fiber coupling device 14, while the single optical output fiber 26 is secured to the output fiber coupling device 24. Both the input fiber coupling device 14 and the output fiber coupling device 24 are used for purposes of ease of optical fiber handling and precision placement, and can be formed of, for example, a silicon V-groove assembly. Referring to FIG. 1b, there is shown a perspective end view of a portion of the multiplexing device 10 revealing how the plurality of optical input fibers 12 are grouped into the one-dimensional input fiber array by the input fiber coupling device 14, and how the single optical output fiber 26 is secured to the output fiber coupling device 24. FIG. 1b also shows a monochromatic optical input beam 28 being transmitted from each of the plurality of optical input fibers 12, and a single multiplexed, polychromatic optical output beam 30 being transmitted to the single optical output fiber 26.

Each of the monochromatic optical input beams 28 being transmitted from the plurality of optical input fibers 12 is carrying a single channel of data at a unique wavelength, which is preferably, but not required to be, within the infrared (IR) region of the electromagnetic spectrum. The single channel of data that is being carried by each monochromatic optical input beam 28 is superimposed on each corresponding unique wavelength by means (e.g., laser diodes connected to the plurality of optical input fibers 12), which are not shown here and which do not form a part of this invention, but are well known in the art. The unique wavelengths of the monochromatic optical input beams 28 are appropriately preselected such that the data channels do not interfere with each other (i.e., there is sufficient channel spacing), and the optical transmission losses through both the optical input fibers 12 and the optical output fiber 26 are low, as is also well known in the art.

The single multiplexed, polychromatic optical output beam 30 being transmitted to the single optical output fiber 26 is carrying a plurality of channels of data at the unique wavelengths of each of the plurality of monochromatic optical input beams 28. The plurality of monochromatic optical input beams 28 are combined into the single multiplexed, polychromatic optical output beam 30 through the combined operation of the plano-convex crystalline collimating lens 16, the transmissive diffraction grating 20, and the plano-convex crystalline focusing lens 22, as will be described in more detail below.

Referring again to FIG. 1a, each of the plurality of monochromatic optical input beams 28 are transmitted from their corresponding optical input fiber 12 into the air space between the input fiber coupling device 14 and the plano-convex crystalline collimating lens 16. Within this air space, the plurality of monochromatic optical input beams 28 are expanded in diameter until they become incident upon the plano-convex crystalline collimating lens 16. The planoconvex crystalline collimating lens 16 collimates each of the plurality of monochromatic optical input beams 28, and then transmits each of a plurality of collimated, monochromatic optical input beams 28' to the reflecting element 18.

The reflecting element 18 is fabricated of a transmissive material such as, for example, optical glass. Thus, each of the plurality of collimated, monochromatic optical input beams 28' is transmitted through the reflecting element 18 toward the reflecting surface 18a, which is formed at a reflecting angle, θ, on a beveled edge of the reflecting element 18. The reflecting surface 18a reflects each of the plurality of collimated, monochromatic optical input beams 28' such that a plurality of reflected, collimated, monochromatic optical input beams 28" are transmitted through the reflecting element 18 toward the transmissive diffraction grating 20. The reflecting angle, θ, is chosen based upon the desired center wavelength diffraction angle of the transmissive diffraction grating 20, as will be described in more detail below.

The transmissive diffraction grating 20 operates to angularly disperse the plurality of reflected, collimated, monochromatic optical input beams 28" by an amount that is dependent upon the wavelength of each of the plurality of reflected, collimated, monochromatic optical input beams 28". That is, the transmissive diffraction grating 20 operates according to the well known diffraction grating equation, $$m\lambda = d(\sin \alpha + \sin \beta)$$

wherein m is the diffraction order, λ is the wavelength, d is the diffraction grating groove spacing, α is the incident angle with respect to the diffraction grating normal, and β is the diffraction angle with respect to the diffraction grating normal. For the multiplexing device 10 shown in FIG. 1a, the diffraction angle, β, is desired to be 0°, so the incident angle, α, is equal to 45° for a center wavelength of 1550 nm and a diffraction grating having an order of 1 and a groove spacing of 0.65 μm. The reflecting angle, θ, is equal to one-half of the incident angle, α, for the multiplexing device 10 shown in FIG. 1a. So the reflecting angle, θ, is equal to 22.50 for the multiplexing device 10 shown in FIG. 1a. Of course, the present invention is not limited to the values just described as they are provided for purposes of illustration only.

At this point it should be noted that the transmissive diffraction grating 20 can be formed from a variety of materials and by a variety of techniques. For example, the transmissive diffraction grating 20 can be formed by a three-dimensional hologram in a polymer medium, or by a mechanical ruling on a planar material such as, for example, glass or silicon. The transmissive diffraction grating 20 could then be joined or affixed to the surface of the reflecting element 18 using optical cement or some other optically transparent bonding technique. Alternatively, the transmissive diffraction grating 20 can be formed directly on the surface of the reflecting element 18, thereby avoiding the joining or affixing of the transmissive diffraction grating 20 to the surface of the reflecting element 18.

As previously mentioned, the transmissive diffraction grating 20 operates to angularly disperse the plurality of reflected, collimated, monochromatic optical input beams 28". Thus, the transmissive diffraction grating 20 removes the angular separation of the plurality of reflected, collimated, monochromatic optical input beams 28", and transmits a single collimated, polychromatic optical output beam 30' towards the plano-convex crystalline focusing lens 22. The single collimated, polychromatic optical output beam 30' contains each of the unique wavelengths of the plurality of reflected, collimated, monochromatic optical input beams 28". Thus, the single collimated, polychromatic optical output beam 30' is a single collimated, multiplexed, polychromatic optical output beam 30'. The plano-convex crystalline focusing lens 22 focuses the single collimated, multiplexed, polychromatic optical output beam 30', and then transmits the resulting single multiplexed, polychromatic optical output beam 30 to the output fiber coupling device 24 where it becomes incident upon the single optical output fiber 26. The single multiplexed, polychromatic optical output beam 30 is then coupled into the single optical output fiber 26 for transmission therethrough.

At this point it should be noted that the single multiplexed, polychromatic optical output beam 30 is insured of being directed to the single optical output fiber 22 in a very efficient manner (i.e., with very low insertion losses and negligible channel crosstalk) by virtue of the enhanced imaging of both the input optical beams 28 and output optical beam 30 within the multiplexing device 10 through the use of the plano-convex crystalline collimating lens 16 and the plano-convex crystalline focusing lens 22. This enhanced imaging of both the input optical beams 28 and output optical beam 30 within the multiplexing device 10 is a direct result of the plano-convex crystalline collimating lens 16 and the plano-convex crystalline focusing lens 22 being formed of a high index of refraction crystalline material.

The use of a high index of refraction crystalline material to form the plano-convex crystalline collimating lens 16 and the plano-convex crystalline focusing lens 22 insures that the multiplexing device 10 operates in a very efficient manner (i.e., with very low insertion losses and negligible channel crosstalk) due to the fact that a large difference exists between the high index of refraction of the planoconvex crystalline collimating lens 16 and the plano-convex crystalline focusing lens 22 and the much lower index of refraction of the air spaces adjacent to these lenses 16, 22.

This large difference between the high index of refraction of the plano-convex crystalline collimating lens 16 and the plano-convex crystalline focusing lens 22 and the much lower index of refraction of the adjacent air spaces allows for the highly efficient collimation and focusing of the input optical beams 28 and output optical beam 30 by the plano-convex crystalline collimating lens 16 and the plano-convex crystalline focusing lens 22, respectively, while simultaneously minimizing the amount of wavelength distortion that is introduced into the optical system of the multiplexing device 10 by these lenses 16, 22. Furthermore, this large difference between the high index of refraction of the planoconvex crystalline collimating lens 16 and the plano-convex crystalline focusing lens 22 and the much lower index of refraction of the adjacent air spaces is much greater than can be achieved using lenses formed of standard optical glasses because standard optical glasses have index of refraction values that are much lower than high index of refraction crystalline materials. Thus, the efficiencies that are achieved by using a high index of refraction crystalline material to form the plano-convex crystalline collimating lens 16 and the plano-convex crystalline focusing lens 22 are greater than can be achieved using lenses formed of standard optical glasses.

Examples of high index of refraction crystalline materials which can be used to form the plano-convex crystalline collimating lens 16 and the plano-convex crystalline focusing lens 22 include silicon (Si), gallium arsenide (GaAs), germanium (Ge), zinc sulfide (ZnS), cadmium sulfide (CDs), zinc selenide (ZnSe), cadmium selenide (CdSe), and any of a number of other appropriate high index of refraction crystalline materials that efficiently transmit optical beams in the infrared (IR) region of the electromagnetic spectrum, since this is the region where the power loss (attenuation) and dispersion of silica-based optical fibers is very low. In fact, most WDM devices are used in the window of 1530–1610 nm, which is the range over which erbium-doped fiber amplifiers (EDFAs) operate and optical fibers have low loss. This 1530–1610 nm region is often called the "third window" for optical fibers. Similarly, however, some WDM devices are also used in the so-called "second window" for optical fibers (i.e., typically within the window of 1300–1330 nm) where optical fibers have very low dispersion and low loss. Consequently, most prior art WDM devices use standard optical glasses that transmit efficiently in these IR regions. For example, standard optical glasses such as BK7, FK3, SF6, and Gradium have optical transmission efficiencies of 97–99% for one-inch material thicknesses in these IR regions. This level of transmission efficiency is generally adequate, but, as previously mentioned, there are cost considerations associated with the use of these materials for lenses in WDM devices (i.e., increased component costs for WDM devices requiring multiple lenses formed of standard optical glass materials, and increased fabrication costs for gradient refractive index lenses). Furthermore, all of these standard optical glasses have index of refraction values (i.e., typically n<2.0) that are much lower than high index of refraction crystalline materials (e.g., for silicon, n=3.46 @1550 nm).

An additional benefit to using a high index of refraction crystalline material to form the plano-convex crystalline collimating lens 16 and the plano-convex crystalline focusing lens 22 is that the use of a crystalline lens allows the collimating lens 16 and the focusing lens 22 to be a plano-convex singlet instead of a bi-convex singlet, doublet, or even higher number lens configuration. This means that the collimating/focusing power of only one curved surface on a crystalline lens is sufficient to provide essentially diffraction-limited collimating/focusing. The relative amount of curvature needed in a typical crystalline lens is very low, and as a result the resulting spherical aberration is very low, almost negligible. It should be noted, however, that the above does not preclude the collimating lens 16 and the focusing lens 22 from being a bi-convex crystalline collimating/focusing singlet, doublet, or even higher number lens configuration. To the contrary, if the collimating lens 16 or the focusing lens 22 is a bi-convex crystalline collimating/focusing singlet, doublet, or even higher number lens configuration, the imaging of both the input optical beams 28 and output optical beam 30 within the multiplexing device 10 is improved even more, as will be discussed in more detail below.

A further benefit to using a high index of refraction crystalline material to form the plano-convex crystalline collimating lens 16 and the plano-convex crystalline focusing lens 22 is that the high index of refraction crystalline material can be used to lessen, and possibly even eliminate, aberrations caused by the spherical nature of the lenses 16, 22. These aberrations are lessened because the much greater refractive index of the high index crystalline material allows the radius of the plano-convex crystalline collimating lens 16 and the plano-convex crystalline focusing lens 22 to be greatly increased (i.e., the lenses have much less curvature), thereby resulting in much less spherical and other aberrations. For example, if the plano-convex crystalline collimating lens 16 or the plano-convex crystalline focusing lens 22 were to be fabricated of silicon (e.g., n=3.46), then, everything else remaining the same, the required radius of the lenses 16, 22 would be much greater (i.e., the lenses would have less curvature or be less steep) than if the lenses 16, 22 were to be fabricated of a typical optical glass (e.g., LaSF 18A manufactured by Schott Glass Technologies, Inc. with n=1.872) due to the large difference between the refractive index values of silicon and air (i.e., 3.46–1.0=2.46) in comparison to the lesser difference between the refractive index values of LaSF 18A and air (i.e., 1.872–1.0=0.872). That is, the difference between the refractive index values of silicon and air is 2.82 times greater than the difference between the refractive index values of LaSF 18A and air. Accordingly, the radius of the lenses 16, 22 if fabricated of silicon is allowed to be 2.82 times greater than the radius of the lenses 16, 22 if fabricated of LaSF 18A. Further, aberrations caused by the spherical nature of the lenses 16, 22 are also typically reduced by this same factor (i.e., by 2.82 times).

The above-described ability to decrease the level of aberrations in the multiplexing device 10 by using a high index of refraction crystalline material to form the plano-convex crystalline collimating lens 16 and the plano-convex crystalline focusing lens 22 is very significant. This discovery insures that the use of high index of refraction materials will result in a very large amount (or degree) of lens design freedom. The high index of refraction can be used either to make the curvature of a lens less steep, or to simplify the number and/or complexity of the lenses that are used in a WDM device.

At this point it should be noted that the plano-convex crystalline collimating lens 16 and the plano-convex crystalline focusing lens 22, as well as any other crystalline collimating/focusing lens described herein as being used in WDM devices in accordance with the present invention, may be spherical or aspherical in shape. Although spherical lenses are more common than aspherical lenses, mainly due to the fact that they are easier to manufacture, the performance of a WDM device may be further improved by using an aspherical crystalline collimating/focusing lens instead of a spherical crystalline collimating/focusing lens. That is, the curvature at the edges of an aspherical crystalline collimating/focusing lens is less steep than the curvature at the edges of a spherical crystalline collimating/focusing lens, thereby resulting in even further reductions in the level of spherical aberrations in a WDM device incorporating such an aspherical crystalline collimating/focusing lens.

At this point it should also be noted that the planoconvex crystalline collimating lens 16 and the plano-convex crystalline focusing lens 22, as well as any other crystalline collimating/focusing lens described herein as being used in WDM devices in accordance with the present invention, is typically coated with an anti-reflection material due to the high index of refraction of the crystalline material.

At this point it should be noted that the plurality of optical input fibers 12 could be replaced in the multiplexing device 10 by a corresponding plurality of laser diodes 32 secured within a coupling device 34, such as shown in FIG. 2a. The coupling device 34 performs a similar function to the input fiber coupling device 14, that being to precisely group the plurality of laser diodes 32 into a one-dimensional input array. The plurality of laser diodes 32 are used in place of the plurality of optical input fibers 12 to transmit the plurality of monochromatic optical input beams 28 to the multiplexing device 10. The array of laser diodes 32 may operate alone, or may be used with appropriate focusing lenses to provide the best coupling and the lowest amount of signal loss and channel crosstalk.

Figure 3:
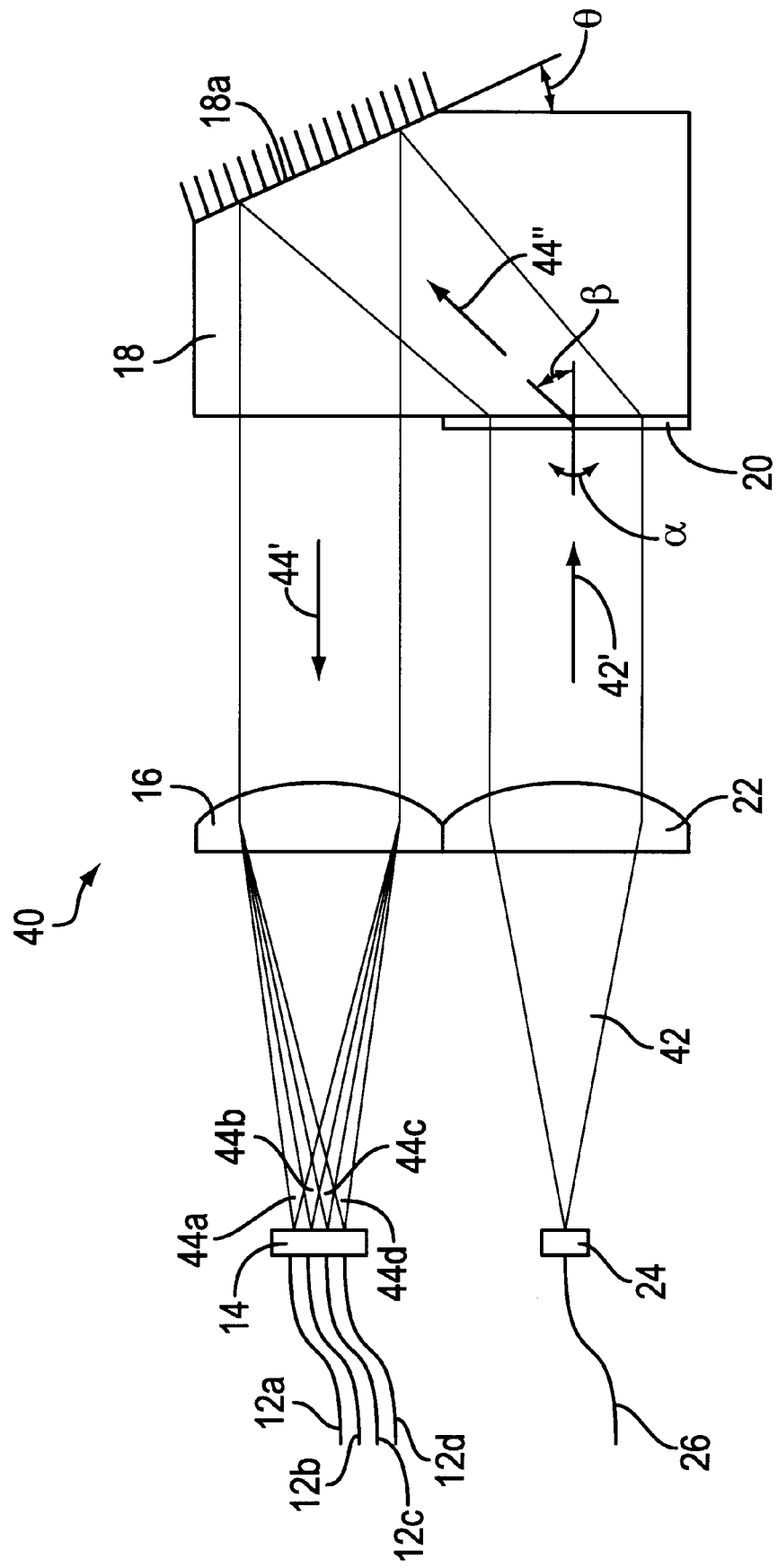
FIG. 3 is a side view of a wavelength division demultiplexing device having dual plano-convex crystalline collimating/focusing lenses and a transmissive diffraction grating in accordance with the present invention.

At this point it should be noted that the multiplexing device 10, as well as all of the multiplexing devices described herein, may be operated in a converse configuration as a demultiplexing device 40, such as shown in FIG. 3. The demultiplexing device 40 is physically identical to the multiplexing device 10, and is therefore numerically identified as such. However, the demultiplexing device 40 is functionally opposite to the multiplexing device 10, wherein the plano-convex crystalline collimating lens 16 now functions as a plano-convex crystalline focusing lens 16 and the planoconvex crystalline focusing lens 22 now functions as a planoconvex crystalline collimating lens 22. That is, a single multiplexed, polychromatic optical input beam 42 is transmitted from the single optical fiber 22, and a plurality of monochromatic optical output beams 44 are transmitted to the plurality of optical fibers 12, wherein each one of the plurality of monochromatic optical output beams 44 is transmitted to a corresponding one of the plurality of optical fibers 12. The single multiplexed, polychromatic optical input beam 42 is simultaneously carrying a plurality of channels of data, each at a unique wavelength which is preferably, but not required to be, within the infrared (IR) region of the electromagnetic spectrum. The plurality of monochromatic optical output beams 44 are each carrying a single channel of data at a corresponding one of the unique wavelengths of the single multiplexed, polychromatic optical input beam 42. In this case, the single multiplexed, polychromatic optical input beam 42 is separated into the plurality of monochromatic optical output beams 44 through the combined operation of the plano-convex crystalline collimating lens 22, the transmissive diffraction grating 20, and the plano-convex crystalline focusing lens 16. That is, the plano-convex crystalline collimating lens 22 collimates the single multiplexed, polychromatic optical input beam 42 to provide a single collimated, multiplexed, polychromatic optical input beam 42'. The transmissive diffraction grating 20 spatially separates the single collimated, multiplexed, polychromatic optical input beam 42' into a plurality of collimated, monochromatic optical input beams 44", which are reflected off the reflecting surface 18a to provide a plurality of reflected, collimated, monochromatic optical input beams 44'. The plano-convex crystalline focusing lens 16 focuses the plurality of reflected, collimated, monochromatic optical input beams 44' to provide the plurality of monochromatic optical output beams 44. Thus, the plano-convex crystalline collimating lens 22, the transmissive diffraction grating 20, and a plano-convex crystalline focusing lens 16 operate to perform a demultiplexing function. Of course, in this case, the incident angle, $\alpha$, and the diffraction angle, $\beta$, are reversed in comparison to the multiplexing device 10 shown in Figure 1a, and the reflecting angle, $\theta$, is equal to one-half of the diffraction angle, $\beta$.

At this point it should be noted that the plurality of optical fibers 12 could be replaced in the demultiplexing device 40 by a corresponding plurality of photodetectors 36 secured within a coupling device 38, such as shown in FIG. 2b. The coupling device 38 performs a similar function to the fiber coupling device 14, that being to precisely group the plurality of photodetectors 36 into a one-dimensional output array. The plurality of photodetectors 36 are used in place of the plurality of optical fibers 12 to receive the plurality of monochromatic optical output beams 44 from the demultiplexing device 40. The array of photodetectors 36 may operate alone, or may be used with appropriate focusing lenses to provide the best coupling and the lowest amount of signal loss and channel crosstalk.

Figure 4:
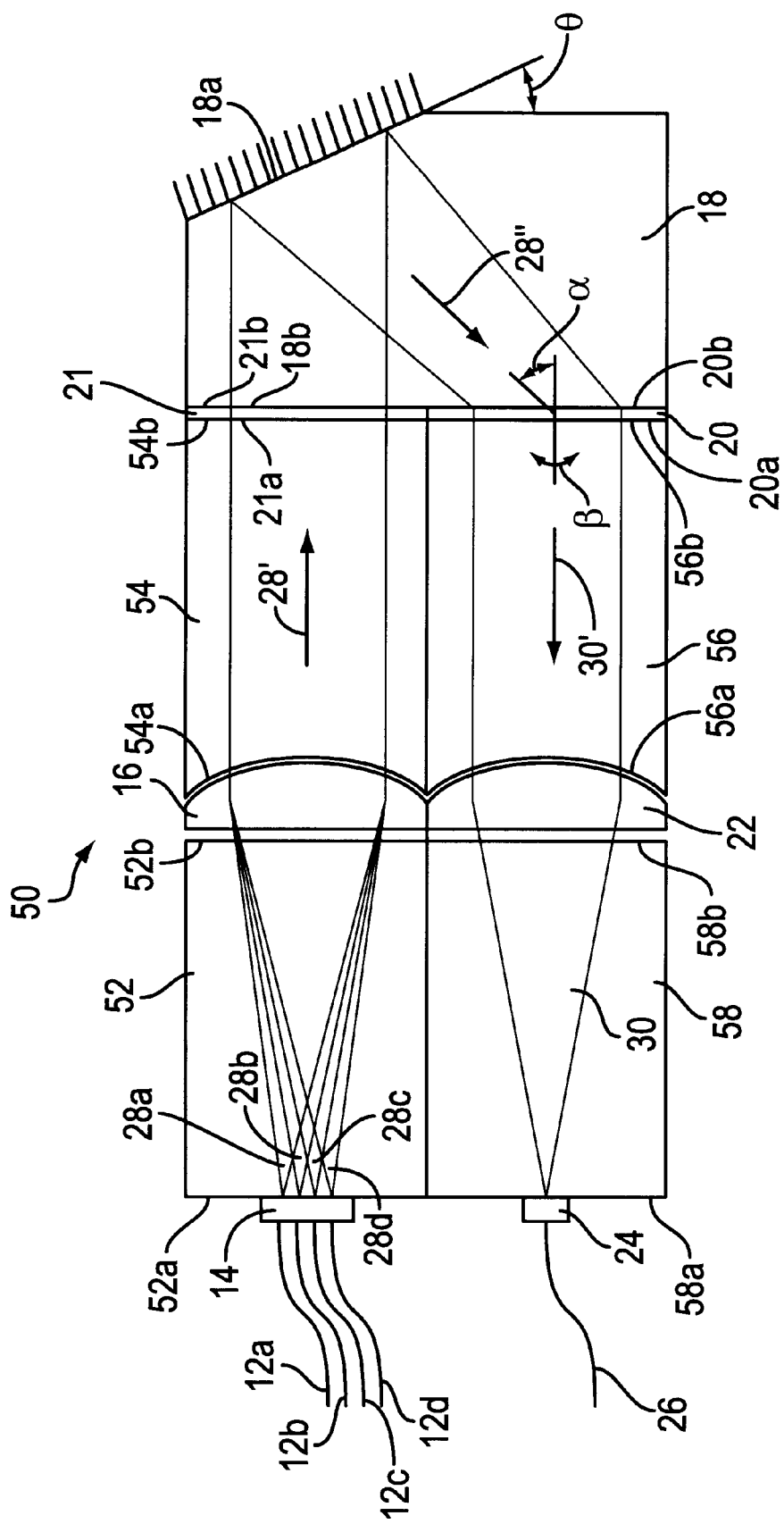
FIG. 4 is a side view of an integrated wavelength division multiplexing device having dual plano-convex crystalline collimating/focusing lenses and a transmissive diffraction grating in accordance with the present invention.

Referring to FIG. 4, there is shown a side view of an alternate embodiment of a wavelength division multiplexing device 50 in accordance with the present invention. The multiplexing device 50 is physically identical to the multiplexing device 10, except for the addition of a first homogeneous index boot lens 52 between the input fiber coupling device 14 and the plano-convex crystalline collimating lens 16, a second homogeneous index boot lens 54 and an optional spacer 21 between the plano-convex crystalline collimating lens 16 and the reflecting element 18, a third homogeneous index boot lens 56 between the transmissive diffraction grating 20 and the plano-convex crystalline focusing lens 22, and a fourth homogeneous index boot lens 58 between the plano-convex crystalline focusing lens 22 and the output fiber coupling device 24. The first homogeneous index boot lens 52, the second homogeneous index boot lens 54, the third homogeneous index boot lens 56, and the fourth homogeneous index boot lens 58 are preferably fabricated, for example, of fused silica (n=1.444), although numerous other optical glass materials may also be used. The optional spacer 21 is preferably fabricated of an optical glass such as, for example, fused silica, and is used to maintain the spacing and alignment between the various parts of the multiplexing device 50.

The first homogeneous index boot lens 52 has a planar front surface 52a for mating with the input fiber coupling device 14 and the associated secured optical input fibers 12. The input fiber coupling device 14 and the secured optical input fibers 12 may be either abutted against the planar front surface 52a or affixed to the planar front surface 52a using optical cement or some other optically transparent bonding technique, depending upon system mobility requirements and optical beam alignment and loss considerations.

The first homogeneous index boot lens 52 also has a planar back surface 52b for mating with the planar surface of the plano-convex crystalline collimating lens 16, while the second homogeneous index boot lens 54 has a concave front surface 54a for mating with the convex surface of the planoconvex crystalline collimating lens 16. The planoconvex crystalline collimating lens 16 is typically joined or affixed to both the planar back surface 52*b* of the first homogeneous index boot lens 52 and the concave front surface 54*a* of the second homogeneous index boot lens 54 using optical cement or some other optically transparent bonding technique.

The second homogeneous index boot lens 54 also has a planar back surface 54*b* for mating with a planar front surface 21*a* of the optional spacer 21, while the optional spacer 21 also has a planar back surface 21*b* for mating with a planar interface surface 18*b* of the reflecting element 18. The optional spacer 21 is typically joined or affixed to both the planar back surface 54*b* of the second homogeneous index boot lens 54 and the planar interface surface 18*b* of the reflecting element 18 using optical cement or some other optically transparent bonding technique.

Similar to the first homogeneous index boot lens 52, the fourth homogeneous index boot lens 58 has a planar front surface 58*a* for mating with the output fiber coupling device 24 and the associated secured optical output fiber 26. The output fiber coupling device 24 and the secured optical output fiber 26 may be either abutted against the planar front surface 58*a* or affixed to the planar front surface 58*a* using optical cement or some other optically transparent bonding technique, depending upon system mobility requirements and optical beam alignment and loss considerations.

The fourth homogeneous index boot lens 58 also has a planar back surface 58*b* for mating with the planar surface of the plano-convex crystalline focusing lens 22, while the third homogeneous index boot lens 56 has a concave front surface 56*a* for mating with the convex surface of the plano-convex crystalline focusing lens 22. The plano-convex crystalline focusing lens 22 is typically joined or affixed to both the planar back surface 58*b* of the fourth homogeneous index boot lens 58 and the concave front surface 56*a* of the third homogeneous index boot lens 56 using optical cement or some other optically transparent bonding technique.

The third homogeneous index boot lens 56 also has a planar back surface 56*b* for typically mating with a planar front surface 20*a* of the transmissive diffraction grating 20, while the transmissive diffraction grating 20 typically has a planar back surface 20*b* for mating with the planar interface surface 18*b* of the reflecting element 18. The transmissive diffraction grating 20 is then typically joined or affixed to both the planar back surface 56*b* of the third homogeneous index boot lens 56 and the planar interface surface 18*b* of the reflecting element 18 using optical cement or some other optically transparent bonding technique. However, as with the multiplexing device 10, the transmissive diffraction grating 20 can be formed directly on the planar interface surface 18*b* of the reflecting element 18, or on the planar back surface 56*b* of the third homogeneous index boot lens 56, thereby avoiding the joining or affixing of the transmissive diffraction grating 20 to the reflecting element 18 or the third homogeneous index boot lens 56, respectively, and also avoiding the need for the optional spacer 21.

In either of the above-described cases, the transmissive diffraction grating 20 is integrated along with the reflecting element 18, the plano-convex crystalline collimating lens 16, the plano-convex crystalline focusing lens 22, and the homogeneous index boot lenses 52, 54, 56, and 58, to form a compact, rigid, and environmentally and thermally stable multiplexing device 50. The integrated nature of this multiplexing device 50 is particularly useful for maintaining component alignment, which provides long-term performance in contrast to some non-integrated air-spaced devices that characteristically degrade in alignment and therefore performance over time.

The multiplexing device 50 is functionally identical to the multiplexing device 10, except for a slight decrease in optical beam transmission efficiency due to the addition of the homogeneous index boot lenses 52, 54, 56, and 58. However, even with this slight decrease in optical beam transmission efficiency, the optical performance of the multiplexing device 50 is still exceptional due to the use of a high index of refraction crystalline material to form the plano-convex crystalline collimating lens 16 and the plano-convex crystalline focusing lens 22. That is, as previously described, the high index of refraction crystalline material can be used to lessen, and possibly even eliminate, aberrations caused by the spherical nature of the lenses 16, 22. And these aberrations are still lessened despite the addition of the homogeneous index boot lenses 52, 54, 56, and 58. For example, if the homogeneous index boot lenses 52, 54, 56, and 58 were to be fabricated of a first type of standard optical glass (e.g., FK3 manufactured by Schott Glass Technologies, Inc. with n=1.450) and if the plano-convex crystalline collimating lens 16 and the plano-convex crystalline focusing lens 22 were to be fabricated of silicon (e.g., n=3.46), then, everything else remaining the same, the required radius of the lenses 16, 22 would be much greater (i.e., the lenses would have less curvature or be less steep) than if the lenses 16, 22 were to be fabricated of a second type of standard optical glass (e.g., LaSF 18A manufactured by Schott Glass Technologies, Inc. with n=1.872) due to the large difference between the refractive index values of silicon and FK3 (i.e., 3.46−1.450=2.01) in comparison to the lesser difference between the refractive index values of LaSF 18A and FK3 (i.e., 1.872−1.450=0.422). That is, the difference between the refractive index values of silicon and FK3 is 4.76 times greater than the difference between the refractive index values of LaSF 18A and FK3. Accordingly, the radius of the lenses 16, 22 if fabricated of silicon is allowed to be 4.76 times greater than the radius of the lenses 16, 22 if fabricated of LaSF 18A. Further, aberrations caused by the spherical nature of the lenses 16, 22 are also typically reduced by this same factor (i.e., by 4.76 times).

Figure 5:
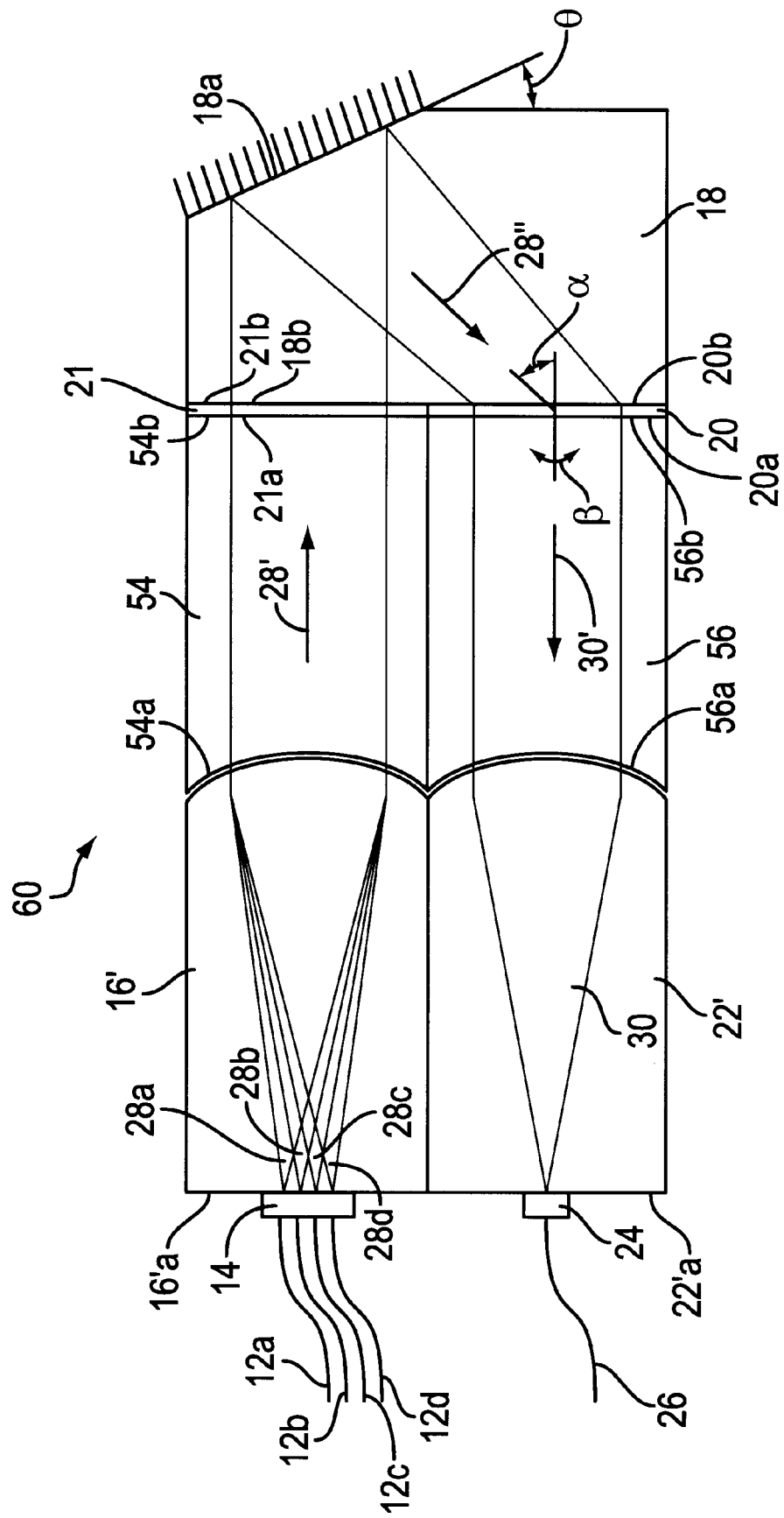
FIG. 5 is a side view of an integrated wavelength division multiplexing device having dual extended plano-convex crystalline collimating/focusing lenses and a transmissive diffraction grating in accordance with the present invention.

Referring to FIG. 5, there is shown a side view of an alternate embodiment of a wavelength division multiplexing device 60 in accordance with the present invention. The multiplexing device 60 is physically identical to the multiplexing device 50, except that the first homogeneous index boot lens 52 has been removed and the planar front surface 16'*a* of the plano-convex crystalline collimating lens 16' has been extended so as to allow the input fiber coupling device 14 and the secured optical input fibers 12 to be either abutted against the planar front surface 16'*a* or affixed to the planar front surface 16'*a* using optical cement or some other optically transparent bonding technique, depending upon system mobility requirements and optical beam alignment and loss considerations, and that the fourth homogeneous index boot lens 58 has been removed and the planar front surface 22'*a* of the plano-convex crystalline focusing lens 22' has been extended so as to allow the output fiber coupling device 24 and the secured optical output fiber 26 to be either abutted against the planar front surface 22'*a* or affixed to the planar front surface 22'*a* using optical cement or some other optically transparent bonding technique, depending upon system mobility requirements and optical beam alignment and loss considerations. The multiplexing device 60 is functionally identical to the multiplexing device 50, except for a slight increase in optical beam transmission efficiency due to the removal of the first homogeneous index boot lens 52 and the fourth homogeneous index boot lens 58.

At this point it should be noted that any of the homogeneous index boot lenses 52, 54, 56, and 58 may be removed from the multiplexing device 50, and either of the homogeneous index boot lenses 54, 56 may be removed from the multiplexing device 60 in order to create additional alternate embodiments (not shown) while still retaining the above-described benefits of using a high index of refraction crystalline material to form the plano-convex crystalline collimating lens 16 and the plano-convex crystalline focusing lens 22.

Figure 6:
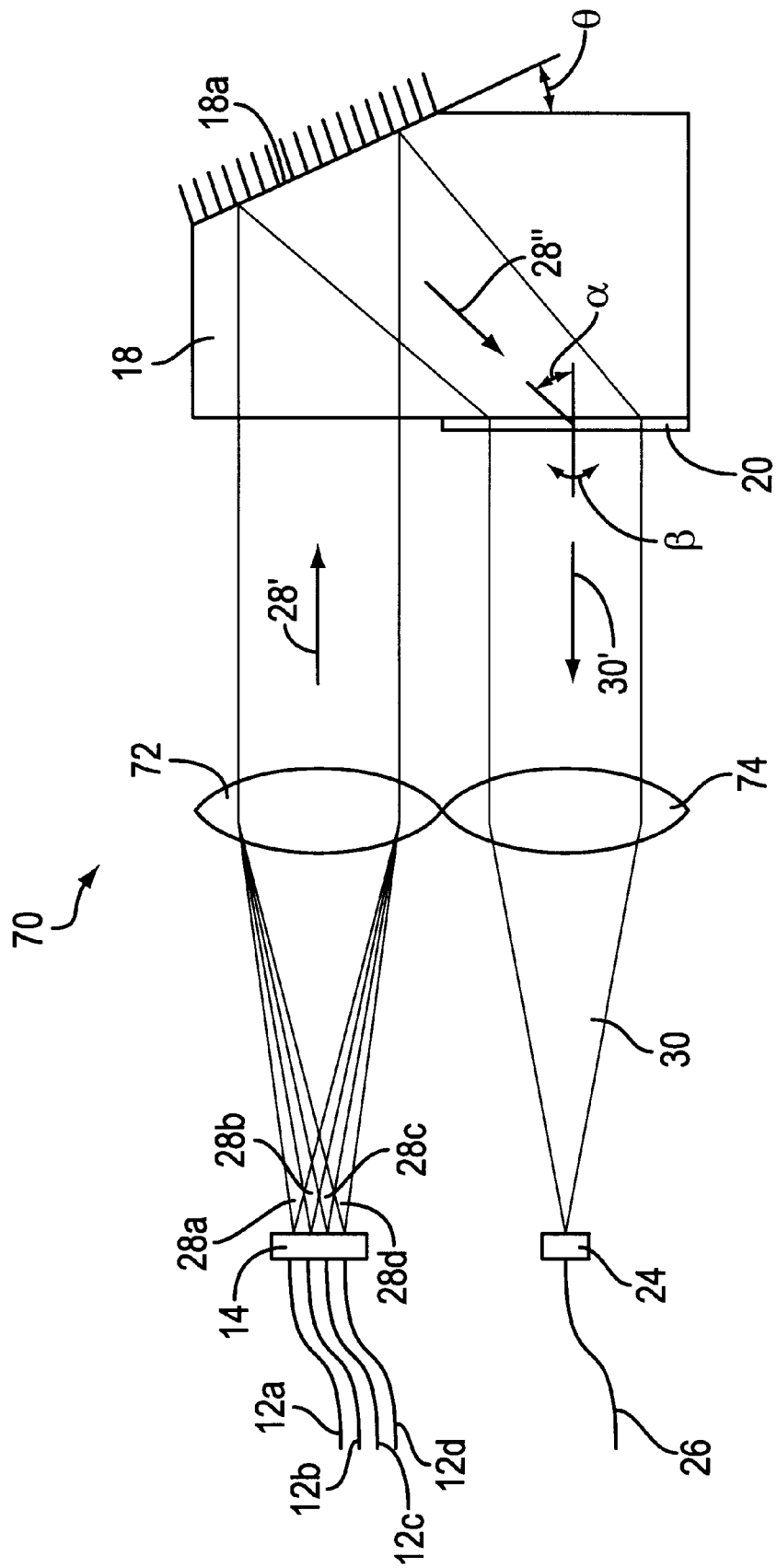
FIG. 6 is a side view of a wavelength division multiplexing device having dual bi-convex crystalline collimating/focusing lenses and a transmissive diffraction grating in accordance with the present invention.

Referring to FIG. 6, there is shown a side view of an alternate embodiment of a wavelength division multiplexing device 70 in accordance with the present invention. The multiplexing device 70 is physically identical to the multiplexing device 10, except that the plano-convex crystalline collimating lens 16 has been replaced by a bi-convex crystalline collimating lens 72 and that the planoconvex crystalline focusing lens 22 has been replaced by a biconvex crystalline focusing lens 74 so as to further enhance the imaging of both the input optical beams 28 and output optical beam 30 within the multiplexing device 70. That is, the additional curved surfaces of the bi-convex crystalline collimating lens 72 and the bi-convex crystalline focusing lens 74 provides additional imaging capability, thereby increasing the fiber coupling efficiency (FCE) of the multiplexing device 70. In contrast to a measure of insertion loss, the FCE of a WDM device expresses the efficiency of only the optical system of the WDM device for each data channel, without taking into account the efficiency of the diffraction grating. Comparatively, the use of the bi-convex crystalline collimating lens 72 and the bi-convex crystalline focusing lens 74 instead of the plano-convex crystalline collimating lens 16 and the plano-convex crystalline focusing lens 22, respectively, typically results in an increase in the FCE of approximately 1% for the configuration of WDM devices shown in FIGS. 1 and 6. Thus, a trade-off must be made between a small increase in the FCE and the additional cost associated with fabricating lenses having an additional curved surface. Of course, further increases in the FCE can typically be achieved using doublet, triplet, or even higher number lens configurations.

Figure 7:
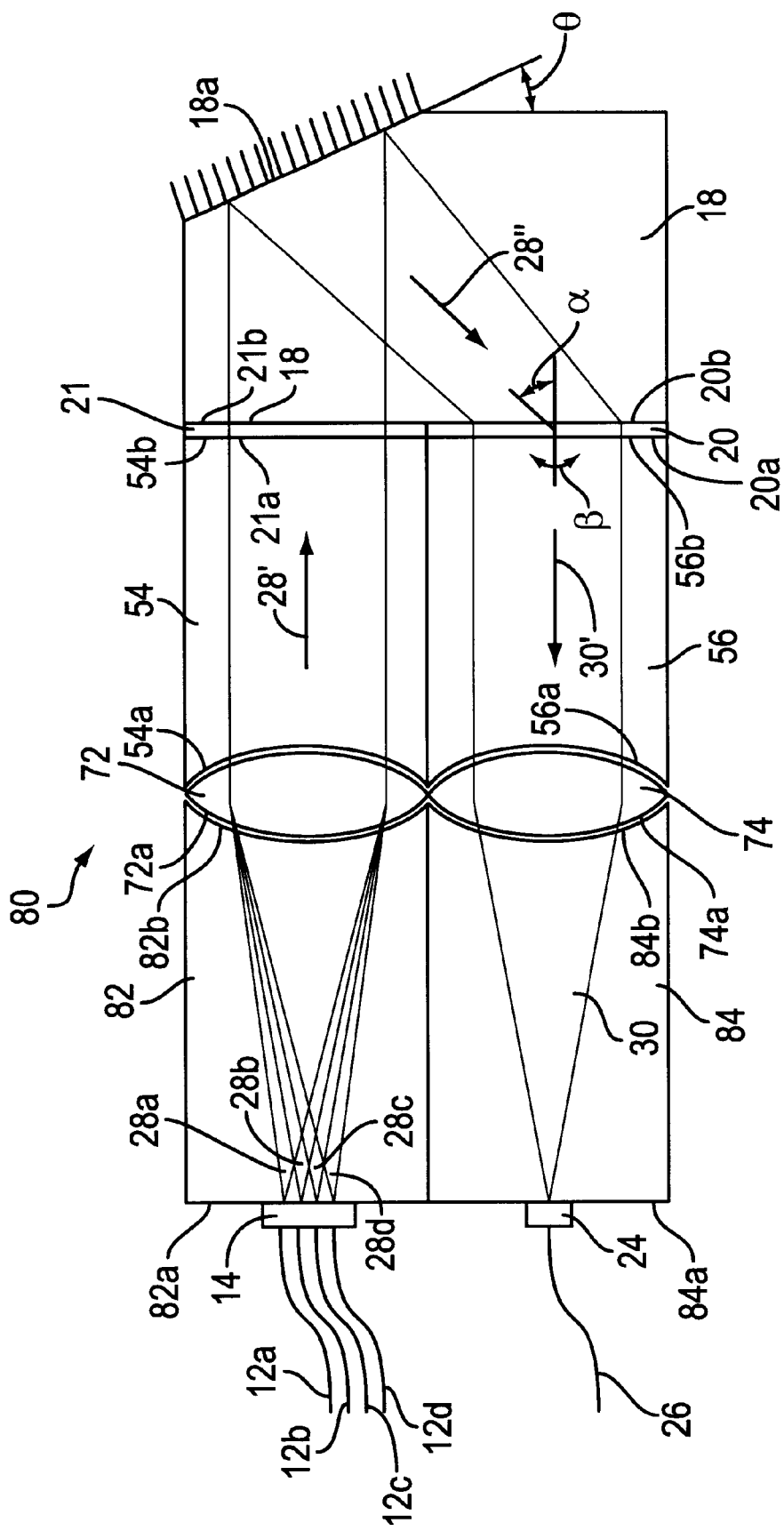
FIG. 7 is a side view of an integrated wavelength division multiplexing device having dual bi-convex crystalline collimating/focusing lenses and a transmissive diffraction grating in accordance with the present invention.

Referring to FIG. 7, there is shown a side view of an alternate embodiment of a wavelength division multiplexing device 80 in accordance with the present invention. The multiplexing device 80 is physically identical to the multiplexing device 50, except that the plano-convex crystalline collimating lens 16 has been replaced by a biconvex crystalline collimating lens 72, the first homogeneous index boot lens 52 has been replaced by a first homogeneous index boot lens 82, the plano-convex crystalline focusing lens 22 has been replaced by a bi-convex crystalline focusing lens 74, and the fourth homogeneous index boot lens 58 has been replaced by a fourth homogeneous index boot lens 84. As with the multiplexing device 70, the replacement of the planoconvex crystalline collimating lens 16 with the bi-convex crystalline collimating lens 72 and the replacement of the plano-convex crystalline focusing lens 22 with the bi-convex crystalline focusing lens 74 in the multiplexing device 80 has been done to further enhance the imaging of both the input optical beams 28 and output optical beam 30 within the multiplexing device 80. The first homogeneous index boot lens 52 has been replaced with the first homogeneous index boot lens 82 because the first homogeneous index boot lens 82 has a concave back surface 82b for mating with the convex front surface 72a of the bi-convex crystalline collimating lens 72. Similarly, the fourth homogeneous index boot lens 58 has been replaced with the fourth homogeneous index boot lens 84 because the fourth homogeneous index boot lens 84 has a concave back surface 84b for mating with the convex front surface 74a of the bi-convex crystalline focusing lens 74.

At this point it should be noted that, as with the multiplexing device 50, any of the homogeneous index boot lenses 82, 54, 56, and 84 may be removed from the multiplexing device 80 in order to create additional alternate embodiments (not shown) while still retaining the above-described benefits of using a high index of refraction crystalline material to form the bi-convex crystalline collimating lens 72 and the biconvex crystalline focusing lens 74. Also, the bi-convex crystalline collimating lens 72 and/or the bi-convex crystalline focusing lens 74 can be replaced with a planoconvex crystalline lens(es), or a crystalline collimating/focusing doublet, triplet, or even higher number lens configuration, in the multiplexing device 80 in accordance with the practices described above.

Figure 8:
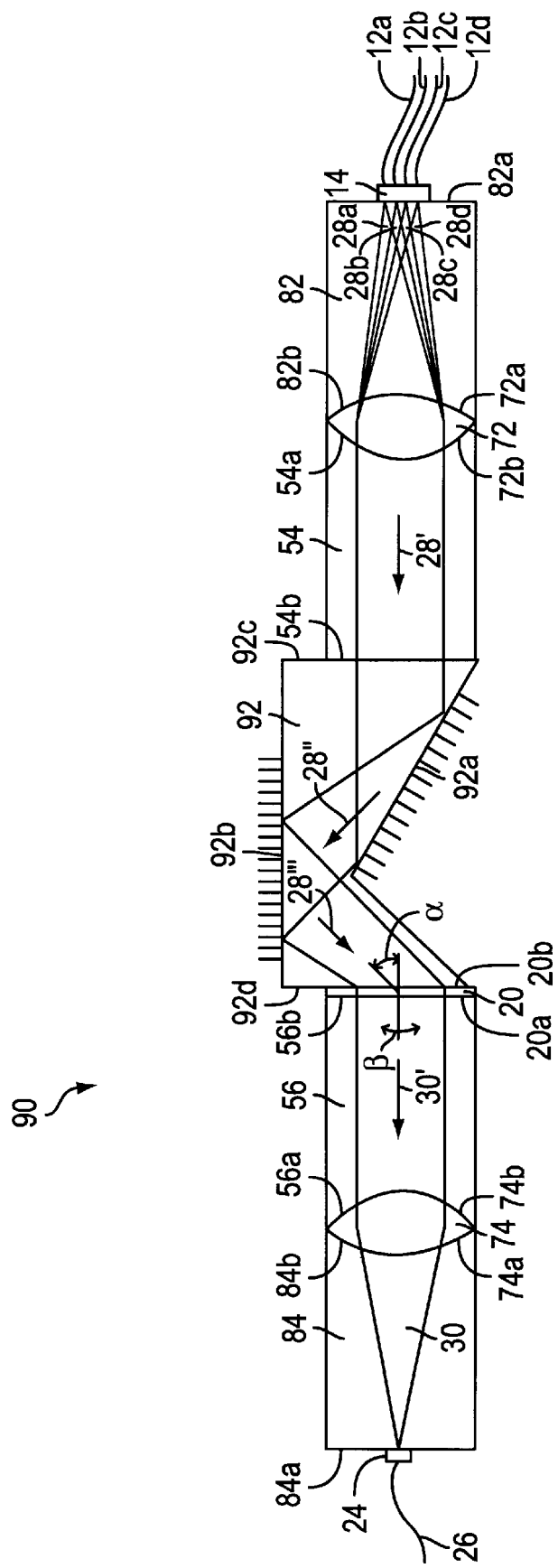
FIG. 8 is a side view of an integrated in-line wavelength division multiplexing device having dual bi-convex crystalline lenses, a transmissive diffraction grating, and a reflecting element in accordance with the present invention.

Referring to FIG. 8, there is shown a side view of an alternate embodiment of a wavelength division multiplexing device 90 in accordance with the present invention. The multiplexing device 90 differs from the previously described embodiments by having an in-line geometry rather than the folded geometry of the previously described embodiments. This in-line geometry is achieved through the use of a dual reflecting element 92, which has a first reflecting surface 92a for reflecting the plurality of collimated, monochromatic optical input beams 28' and a second reflecting surface 92b for reflecting the plurality of reflected, collimated, monochromatic optical input beams 28". Note that, in contrast to the previously described embodiments, the multiplexing device 90 does not require the optional spacer 21 to maintain the spacing and alignment between the various parts of the multiplexing device 90. Otherwise, the multiplexing device 90 is functionally identical to and utilizes all of the components used in the multiplexing device 80, except of course the reflecting element 18.

At this point it should be noted that, as with the multiplexing device 50 and the multiplexing device 80, any of the homogeneous index boot lenses 82, 54, 56, and 84 may be removed from the multiplexing device 90 in order to create additional alternate embodiments (not shown) while still retaining the above-described benefits of using a high index of refraction crystalline material to form the bi-convex crystalline collimating lens 72 and the bi-convex crystalline focusing lens 74. Also, the bi-convex crystalline collimating lens 72 and/or the bi-convex crystalline focusing lens 74 can be replaced with a plano-convex crystalline lens(es), or a crystalline collimating/focusing doublet, triplet, or even higher number lens configuration, in the multiplexing device 90 in accordance with the practices described above. The benefits and detriments associated with using these substitute/additional components are applicable to the multiplexing device 90 as would be the case with the previously described embodiments. Of course, the most significant benefits come from the use of high index of refraction crystalline materials for the lenses. That is, regardless of embodiment, the use of high index of refraction crystalline materials for lenses in WDM devices yields increased device performance, as well as reduced device cost, complexity, and manufacturing risk. Simply said, the use of high index of refraction crystalline lenses allows for the construction of a family of simple, low cost, yet very powerful WDM devices, particularly for use in DWDM (i.e., high channel number) applications.

In addition to those discussed above, there are other advantages to using high index of refraction crystalline materials rather than standard optical glass materials for lenses in WDM devices. Below is a discussion of some of these advantages.

1. High Refractive Index: As mentioned above, materials such as silicon (Si), germanium (Ge), gallium arsenide (GaAs), zinc sulfide (ZnS), cadmiun sulfide (CdS), zinc selenide (ZnSe), cadmiun selenide (CdSe), or any of a number of other appropriate high index of refraction crystalline materials all have refractive indices that are higher than any practically available optical glass materials. The use of high index of refraction crystalline materials gives more "horsepower" to a lens design. That is, the use of high index of refraction crystalline materials insures that there is a large amount of additional design flexibility available to either lower the aberrations in a WDM device, simplify the complexity of the lenses used in a WDM device, or extend the capabilities of a WDM device (e.g., by adding additional data channels). Compared to the use of optical glass lenses, crystalline lenses allow a WDM device to have equivalent or better optical performance, as typically measured by the fiber coupling efficiency (FCE) of the WDM device.

2. Refractive Index Accuracy: Crystalline lenses by nature of being crystalline are ultra accurate and precise in their refractive index and dispersion values. For example, the refractive index of a crystalline material is typically constant from batch to batch to better than 1 part in the $4^{th}$ decimal place (e.g., <3.XXXX±0.0001). This is the inherent nature of crystalline materials. This refractive index precision essentially eliminates design and manufacturing problems caused by variations in materials. However, depending upon the processing method, certain crystalline materials can be alloyed or contain impurities, but this does not appear to be a significant concern for the use of silicon which is commonly and economically prepared at a very high level of purity for the semiconductor industry. Compared to optical glass lenses, crystalline lenses have about 10 to 100 times more precise refractive index and dispersion values. For example, it is common to use an H1 grade of optical glass, which has a refractive index accuracy of +/−0.001 (melt-to-melt variation) and a precision (part-to-part variation) of +/−0.00002 within any portion of a single lens or lens blank. Similarly, gradient refractive index glass (e.g., Gradium glass) generally has a refractive index accuracy of not less than 0.0006 (melt-to-melt variation).

3. Commercial Availability: Crystalline materials such as silicon (Si), germanium (Ge), gallium arsenide (GaAs), zinc sulfide (ZnS), cadmiun sulfide (CdS), zinc selenide (ZnSe), and cadmiun selenide (CdSe) are available from multiple sources. Thus, the use of crystalline materials typically does not give rise to single-source problems. On the other hand, optical glasses are presently commercially available from 3 major companies: Schott Glass Technologies, Ohara Corporation, and Corning France. Typically, however, glass of the same type from one company is different when obtained from another company. Therefore, optical glass is typically a single source material. This problem can be, and often is, minimized to a degree by long production runs and by maintaining an inventory of material. Gradient refractive index glass (e.g., Gradium glass) is presently produced by a single source vendor (LightPath Technologies, Inc.), and is not presently inventoried in significant volumes.

4. Procurement Lead Times: Some crystalline materials require fairly long lead times to procure. However, silicon is often available from inventory or with a relatively short lead-time. Optical glasses are available from inventory about half of the time, but otherwise must be imported or ordered from the next melting cycle. Gradient refractive index glass (e.g., Gradium glass) are typically manufactured to order.

5. Lens Fabrication Issues: The fabrication of crystalline IR materials into lenses is fairly common, but probably less so than traditional optical glasses. Presently, approximately half of all lens fabricators work with silicon and/or other crystalline IR materials. Silicon is the most common crystalline IR material fabricated into lenses. There are no know serious issues related to the grinding and polishing of this material. The grinding and polishing techniques and slurries used for crystalline materials are different than those for optical glasses. Further, crystalline IR materials have a crystallographic orientation that must be considered when lenses are fabricated, but this is commonly understood and typically not an issue. In comparison, optical glass materials are typically isotropic. Approximately 10 of the 40 largest lens fabrication houses in the U.S. are presently capable of fabricating Gradium glass lenses. The fabrication of Gradium glass lenses is complicated due to the necessity of both keeping the gradient axis properly oriented and the necessity of thinning the glass down to within approximately 50 microns of the proper position in the refractive index profile. The proper thinning of the Gradium glass requires special attention by the lens fabricator and increases the fabrication cost of a lens by 30–100% over the cost of fabricating a comparable homogeneous lens.

6. Material and Lens Fabrication Costs: The costs of crystalline IR materials can be slightly higher than optical glasses, with the notable exception being silicon. Since silicon is widely used in the semiconductor industry and for other IR optics applications, the price for silicon is fairly low and constant, sometimes even lower than optical glass materials. For example, silicon lenses nominally 2 cm in diameter cost (material and fabrication costs combined) approximately $200 per lens and about $50 per 100 lenses. This is very nearly the same cost for most homogeneous optical glass lenses. Gradium glass lenses are approximately $400 per lens in small quantities and not less than $200 in large volumes.

7. Ease of Lens Design: The same procedures and lens design codes can be used for the design of crystalline IR materials as for homogenous optical glasses. Lens designs that use Gradium glasses require ray-tracing code that can properly perform gradient refracting index ray tracing. Typically, the added computation complexity of gradient index ray tracing is 3 to 10 times greater than for designs using crystalline or homogeneous glass lenses.

8. Lens Radius Tolerances: In general, the tolerance for a single plano-convex crystalline lens is typically tighter than for multiple homogenous lenses. For example, a plano-convex silicon singlet-based design typically requires a tighter tolerance of 1 fringe×½ wave irregularity. This is due to the single curved surface on the silicon lens being responsible for all of the collimation/focusing. However, the tighter tolerance on the plano-convex silicon lens is not significantly more costly or difficult to fabricate. Further, multiple optical glass lenses are typically required to achieve the performance obtained with a single crystalline lens.

9. Thermal Expansion: The thermal expansion of silicon is only $2.3 \times 10^{-6}/°$ C. This is about 3.5 times lower than typical homogeneous optical glasses and Gradium glasses. The lower expansion of silicon could be very desirable for a very low expansion WDM device. By reducing the thermal expansion, the WDM device has less dimensional change with temperature, and this results in less insertion loss or crosstalk sensitivity to temperature change, which can be very desirable. Also, the construction of a low expansion WDM device can allow the device to be used over a much wider temperature range potentially without the need for a thermoelectric cooler or other heater type of device. Typically, in homogeneous glass and Gradium glass based approaches, a WDM device comprises other spacer glasses which have similar expansion to the glasses used in the collimating lens assembly (typically $8-9\times10^{-6}$). The use of silicon allows low expansion glasses and glass-ceramic materials such as Pyrex, Zerodur, Fused Silica, Fused Quartz, Pyroceram, Clearceram, etc. to be used for the glass spacers. The use of the low expansion materials also helps eliminate any thermal stresses related to the use of a silicon v-groove, which also has low expansion.

10. Optical Assembly: Perhaps the most important point here is that there are no unusual problems with either cementing homogenous glass to silicon or cementing an antireflection coated silicon lens to a homogenous lens. In fact, several glasses having coefficients of thermal expansion 2 to 3 times higher than silicon have been cemented to silicon without any unusual problems.

11. Thermal Conductivity: The thermal conductivity of silicon is very high, with a value of 200 W/m-K. Common optical glasses have thermal conductivities within the range of 0.7 to 1.1 W/m-K.

12. Ease of Rapid Prototyping and Product Development: The high uniformity of crystalline materials and the ease of performing the lens design allows for rapid prototyping of a WDM containing a crystalline lens. Although this is also true for the use of homogeneous lenses, it is not for the use of Gradium glasses. For example, for a WDM device such as disclosed herein, new gradient refractive index profiles would be necessary to obtain the correct level of aberration correction.

The present invention is not to be limited in scope by the specific embodiments described herein. Indeed, various modifications of the present invention, in addition to those described herein, will be apparent to those of skill in the art from the foregoing description and accompanying drawings. Thus, such modifications are intended to fall within the scope of the appended claims.

What is claimed is:

1. A wavelength division multiplexing device comprising:
a crystalline collimating lens for collimating a plurality of monochromatic optical beams;
a diffraction grating for combining the plurality of collimated, monochromatic optical beams into a multiplexed, polychromatic optical beam; and
a crystalline focusing lens for focusing the multiplexed, polychromatic optical beam.

2. The device of claim 1, wherein the diffraction grating is a transmissive diffraction grating.

3. The device of claim 1, wherein the crystalline collimating lens and the crystalline focusing lens have high indexes of refraction.

4. The device of claim 1, wherein the crystalline collimating lens and the crystalline focusing lens operate in the infrared region of the electromagnetic spectrum.

5. The device of claim 1, wherein at least one of the crystalline collimating lens and the crystalline focusing lens is a plano-convex lens.

6. The device of claim 1, wherein at least one of the crystalline collimating lens and the crystalline focusing lens is a bi-convex lens.

7. The device of claim 1, wherein at least one of the crystalline collimating lens and the crystalline focusing lens is a spherical lens.

8. The device of claim 1, wherein at least one of the crystalline collimating lens and the crystalline focusing lens is an aspherical lens.

9. The device of claim 1, wherein the crystalline collimating lens and the crystalline focusing lens are formed of a crystalline material selected from the group consisting of silicon, germanium, gallium arsenide, zinc sulfide, cadmium sulfide, zinc selenide, and cadmium selenide.

10. An integrated wavelength division multiplexing device comprising:
a crystalline collimating lens for collimating a plurality of monochromatic optical beams;
a homogeneous index boot lens affixed to the crystalline collimating lens for transmitting the plurality of collimated, monochromatic optical beams from the crystalline collimating lens, the homogeneous index boot lens having a planar exit surface; and
a diffraction grating formed at the planar exit surface of the homogeneous index boot lens for combining the plurality of collimated, monochromatic optical beams into a multiplexed, polychromatic optical beam.

11. The device of claim 10, wherein the homogeneous index boot lens is a first homogeneous index boot lens, the device further comprising:
a second homogeneous index boot lens affixed to the crystalline collimating lens for transmitting the plurality of monochromatic optical beams to the crystalline collimating lens.

12. The device of claim 11, wherein the second homogeneous index boot lens has a planar entry surface for accepting the plurality of monochromatic optical beams from at least one optical source.

13. The device of claim 10, wherein the crystalline collimating lens has a planar entry surface for accepting the plurality of monochromatic optical beams from at least one optical source.

14. The device of claim 10, wherein the diffraction grating is a transmissive diffraction grating.

15. The device of claim 14, further comprising:
a transmissive element associated with the transmissive diffraction grating, the transmissive element having at least one reflective surface for reflecting the multiplexed, polychromatic optical beam.

16. The device of claim 15, wherein the homogeneous index boot lens is a first homogeneous index boot lens, the device further comprising:
a second homogeneous index boot lens affixed to the transmissive element for transmitting the multiplexed, polychromatic optical beam from the transmissive element; and
a crystalline focusing lens affixed to the second homogeneous index boot lens for focusing the multiplexed, polychromatic optical beam.

17. The device of claim 16, further comprising:
a third homogeneous index boot lens affixed to the crystalline focusing lens for transmitting the focused, multiplexed, polychromatic optical beam from the crystalline focusing lens.

18. The device of claim 17, wherein the third homogeneous index boot lens has a planar exit surface for outputting the focused, multiplexed, polychromatic optical beam to at least one optical receiver.

19. The device of claim 16, wherein the crystalline focusing lens has a planar exit surface for outputting the focused, multiplexed, polychromatic optical beam to at least one optical receiver.

20. An integrated wavelength division multiplexing device comprising:

a crystalline focusing lens for focusing a multiplexed, polychromatic optical beam;

a homogeneous index boot lens affixed to the crystalline focusing lens for transmitting the multiplexed, polychromatic optical beam to the crystalline focusing lens, the homogeneous index boot lens having a planar entry surface; and a diffraction grating formed at the planar entry surface of the homogeneous index boot lens for combining a plurality of monochromatic optical beams into the multiplexed, polychromatic optical beam.

21. The device of claim 20, wherein the diffraction grating is a transmissive diffraction grating.

22. The device of claim 21, further comprising:

a transmissive element associated with the transmissive diffraction grating, the transmissive element having at least one reflective surface for reflecting the plurality of monochromatic optical beams toward the transmissive diffraction grating.

23. The device of claim 22, wherein the homogeneous index boot lens is a first homogeneous index boot lens, the device further comprising:

a second homogeneous index boot lens affixed to the transmissive element for transmitting the plurality of monochromatic optical beams to the transmissive element; and a crystalline collimating lens affixed to the second homogeneous index boot lens for collimating the plurality of monochromatic optical beams prior to transmission by the second homogeneous index boot lens.

24. A wavelength division demultiplexing device comprising:

a crystalline collimating lens for collimating a multiplexed, polychromatic optical beam;

a diffraction grating for separating the collimated, multiplexed, polychromatic optical beam into a plurality of monochromatic optical beams; and a crystalline focusing lens for focusing the plurality of monochromatic optical beams.

25. The device of claim 24, wherein the diffraction grating is a transmissive diffraction grating.

26. The device of claim 24, wherein the crystalline collimating lens and the crystalline focusing lens have high indexes of refraction.

27. The device of claim 24, wherein the crystalline collimating lens and the crystalline focusing lens operate in the infrared region of the electromagnetic spectrum.

28. The device of claim 24, wherein at least one of the crystalline collimating lens and the crystalline focusing lens is a plano-convex lens.

29. The device of claim 24, wherein at least one of the crystalline collimating lens and the crystalline focusing lens is a bi-convex lens.

30. The device of claim 24, wherein at least one of the crystalline collimating lens and the crystalline focusing lens is a spherical lens.

31. The device of claim 24, wherein at least one of the crystalline collimating lens and the crystalline focusing lens is an aspherical lens.

32. The device of claim 24, wherein the crystalline collimating lens and the crystalline focusing lens are formed of a crystalline material selected from the group consisting of silicon, germanium, gallium arsenide, zinc sulfide, cadmium sulfide, zinc selenide, and cadmium selenide.

33. An integrated wavelength division demultiplexing device comprising:

a crystalline collimating lens for collimating a multiplexed, polychromatic optical beam;

a homogeneous index boot lens affixed to the crystalline collimating lens for transmitting the collimated, multiplexed, polychromatic optical beam from the crystalline collimating lens, the homogeneous index boot lens having a planar exit surface; and a diffraction grating formed at the planar exit surface of the homogeneous index boot lens for separating the collimated, multiplexed, polychromatic optical beam into a plurality of monochromatic optical beams.

34. The device of claim 33, wherein the homogeneous index boot lens is a first homogenous index boot lens, the device further comprising:

a second homogeneous index boot lens affixed to the crystalline collimating lens for transmitting the multiplexed, polychromatic optical beam to the crystalline collimating lens.

35. The device of claim 34, wherein the second homogeneous index boot lens has a planar entry surface for accepting the multiplexed, polychromatic optical beam from at least one optical source.

36. The device of claim 33, wherein the crystalline collimating lens has a planar entry surface for accepting the multiplexed, polychromatic optical beam from at least one optical source.

37. The device of claim 33, wherein the diffraction grating is a transmissive diffraction grating.

38. The device of claim 37, further comprising:

a transmissive element associated with the transmissive diffraction grating, the transmissive element having at least one reflective surface for reflecting the plurality of monochromatic optical beams.

39. The device of claim 38, wherein the homogeneous index boot lens is a first homogeneous index boot lens, the device further comprising:

a second homogeneous index boot lens affixed to the transmissive element for transmitting the plurality of monochromatic optical beams from the transmissive element; and a crystalline focusing lens affixed to the second homogeneous index boot lens for focusing the plurality of monochromatic optical beams.

40. The device of claim 39, further comprising:

a third homogeneous index boot lens affixed to the crystalline focusing lens for transmitting the plurality of focused, monochromatic optical beams from the crystalline focusing lens.

41. The device of claim 40, wherein the third homogeneous index boot lens has a planar exit surface for outputting the plurality of focused, monochromatic optical beams to at least one optical receiver.

42. The device of claim 39, wherein the crystalline focusing lens has a planar exit surface for outputting the plurality of focused, monochromatic optical beams to at least one optical receiver.

43. An integrated wavelength division demultiplexing device comprising:

a crystalline focusing lens for focusing a plurality of monochromatic optical beams;

a homogeneous index boot lens affixed to the crystalline focusing lens for transmitting the plurality of monochromatic optical beams to the crystalline focusing lens, the homogeneous index boot lens having a planar entry surface; and a diffraction grating formed at the planar entry surface of the homogeneous index boot lens for separating a multiplexed, polychromatic optical beam into the plurality of monochromatic optical beams.

44. The device of claim 43, wherein the diffraction grating is a transmissive diffraction grating.

45. The device of claim 44, further comprising:

a transmissive element associated with the transmissive diffraction grating, the transmissive element having at least one reflective surface for reflecting the multiplexed, polychromatic optical beam toward the transmissive diffraction grating.

46. The device of claim 45, wherein the homogeneous index boot lens is a first homogenous index boot lens, the device further comprising:

a second homogeneous index boot lens affixed to the transmissive element for transmitting the multiplexed, polychromatic optical beam to the transmissive element; and a crystalline collimating lens affixed to the second homogeneous index boot lens for collimating the multiplexed, polychromatic optical beam prior to transmission by the second homogeneous index boot lens.

* * * * *